(12) United States Patent
Isoda et al.

(10) Patent No.: US 6,477,587 B1
(45) Date of Patent: Nov. 5, 2002

(54) COMMAND-BASED COMMUNICATIONS BETWEEN AN INITIATOR AND A TARGET

(75) Inventors: Takashi Isoda, Tokyo; Akihiro Shimura, Kawasaki, both of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/310,952

(22) Filed: May 13, 1999

(30) Foreign Application Priority Data

May 15, 1998 (JP) .......................................... 10-133994

(51) Int. Cl.$^7$ .............................................. G06F 13/00
(52) U.S. Cl. ............................... 710/6; 710/20; 710/33; 710/52
(58) Field of Search ............................ 710/1–7, 20–24, 710/33–35, 52–57

(56) References Cited

U.S. PATENT DOCUMENTS

| | | | |
|---|---|---|---|
| 4,644,533 A | 2/1987 | Braff et al. ..................... | 370/94 |
| 4,868,742 A | 9/1989 | Gant et al. .................... | 364/200 |
| 5,050,066 A * | 9/1991 | Myers et al. ................... | 714/18 |
| 5,363,488 A * | 11/1994 | Hidaka et al. ................. | 710/5 |
| 5,548,791 A | 8/1996 | Casper et al. ............... | 395/858 |
| 5,758,041 A | 5/1998 | Shimura ....................... | 395/113 |
| 5,835,721 A * | 11/1998 | Donahue et al. ............ | 709/224 |
| 6,055,598 A * | 4/2000 | Lange ......................... | 710/129 |
| 6,173,339 B1 * | 1/2001 | Yorimitsu ..................... | 710/5 |
| 6,240,474 B1 * | 5/2001 | Guthrie et al. .............. | 710/105 |
| 6,301,639 B1 * | 10/2001 | Cleavinger et al. ......... | 711/112 |

FOREIGN PATENT DOCUMENTS

| | | |
|---|---|---|
| EP | 0503092 | 9/1992 |
| EP | 0851352 A2 * | 1/1998 |
| EP | 0902371 | 3/1999 |
| EP | 0939530 | 9/1999 |
| WO | WO94/08298 | 4/1994 |
| WO | WO 98/14861 | 4/1998 |

OTHER PUBLICATIONS

Patent Abstracts of Japan, Ricoh Co. Ltd, vol. 1997, No. 3 (Mar. 1997) & JP 08–317106 of Nov. 29 1996.

* cited by examiner

Primary Examiner—Christopher B. Shin
(74) Attorney, Agent, or Firm—Fitzpatrick, Cella, Harper & Scinto

(57) ABSTRACT

An initiator holds commands corresponding to ORBs issued to a target in an I/O request queue until it receives a completion response from the target. The target has read and write execution agents, and processes commands from the initiator. When a connection between the initiator and target is disconnected, and is connected again, the initiator deletes all ORBs, and generates and issues ORBs again to the target on the basis of the commands held in the I/O request queue. Upon processing an ORB, the target holds an identifier of the ORB whose processing is in progress, and the address of a buffer which is undergoing a read or write. After re-connection, the target compares the held identifier with the identifier of an ORB re-issued by the initiator. If the two identifiers match each other, the target restarts the read or write from the held address. If the two identifiers do not match, the target determines that the corresponding ORB has already been processed, and sends back processing completion status to the initiator.

16 Claims, 25 Drawing Sheets

FIG. 9

| most significant | | | | | | | | least significant |
|---|---|---|---|---|---|---|---|---|
| Next_ORB |||||||||
| data_descriptor |||||||||
| n | rq_fmt(0) | r | d | spd | max_payload | p | page_size | data_size |
| PSID | | | | | SSID | | Function ($40_{16}$) | t | seq_ID |
| Reserved |||||||||

FIG. 10B

| VALUE | SHPT FUNCTION |
|---|---|
| 0 | WRITE |
| $1\text{-}3F_{16}$ | RESERVED FOR FUTURE STANDARDIZATION |
| $40_{16}$ | READ |
| $41_{16}$ | DATA AVAILABLE |
| $42_{16}\text{-}FF_{16}$ | RESERVED FOR FUTURE STANDARDIZATION |

FIG. 10C

| VALUE | SHPT_status |
|---|---|
| 0 | FULLY COMPLETED |
| 1 | PARTIAL COMPLETED |
| 2 | ERROR |
| $3\text{-}7F_{16}$ | RESERVED FOR FUTURE STANDARDIZATION |

FIG. 12

| src | resp | d | ℓen | sbp_status | ORB_offset_hi |
|---|---|---|---|---|---|
| | | | | ORB_offset_ℓo | |
| PSID | | | SSID | Function (40₁₆) | t | SHPT_status |
| reserved | | | | ℓength_hi | |
| | | | | ℓength_ℓo | |
| reserved | | | | | | most significant → least significant (Note: "r" appears as a small field near SHPT_status)

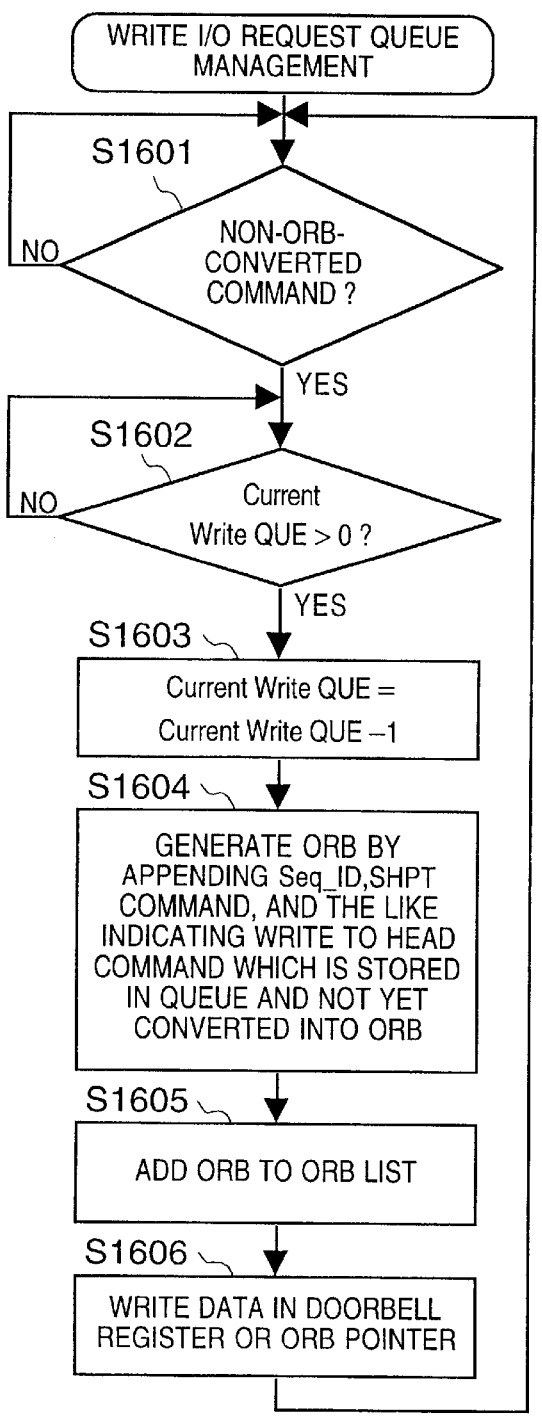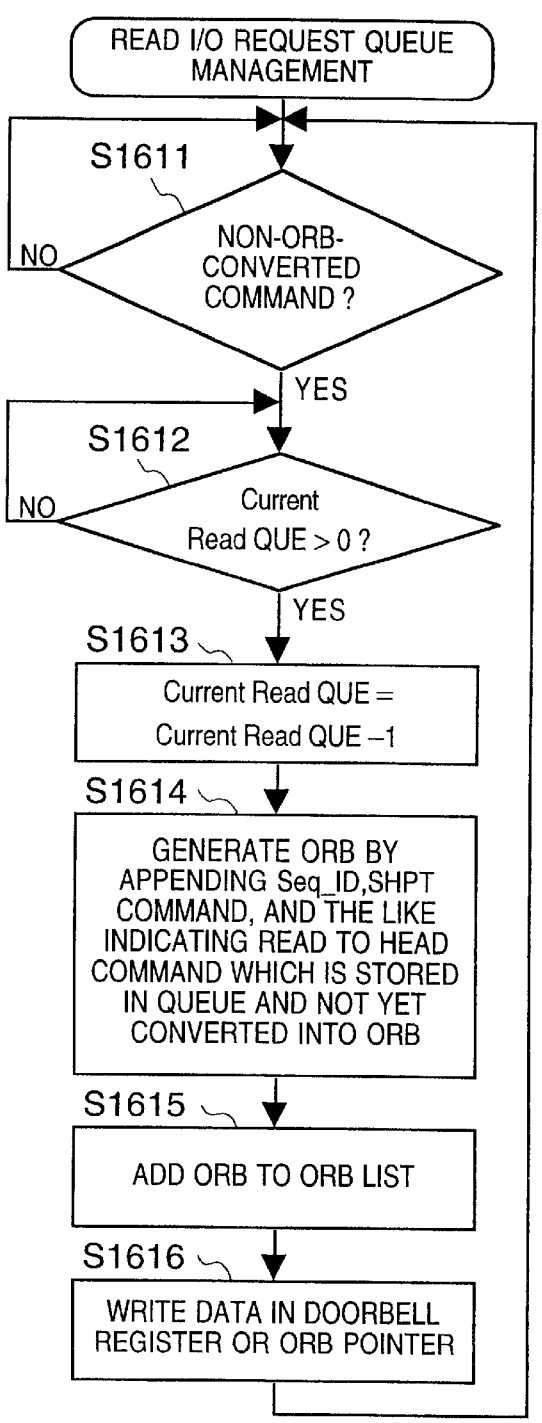
FIG. 16A / FIG. 16B

COMMAND-BASED COMMUNICATIONS BETWEEN AN INITIATOR AND A TARGET

BACKGROUND OF THE INVENTION

The present invention relates to a communication method and apparatus for connecting devices such as a host computer, printer, and the like.

In recent years, an IEEE1394 interface is prevalently used in connections of a computer and peripheral device or of different peripheral devices. The IEEE1394 interface can assure fast, two-way communications compared to handshaking such as a Centronics interface or the like. Also, since the IEEE1394 interface is a memory bus model interface, devices connected via the IEEE1394 interface can read data at a designated address or can write data at a designated address with respect to a partner device.

The IEEE1394 standard defines the protocols of the physical and link layers in only broad terms, and does not define detailed protocols in units of devices. For this reason, the protocol of the transport layer such as SBP (Serial Bus Protocol)-2, which uses IEEE1394 as physical and link layers, has been proposed. The transport layer provides a data transfer function to an application, and applications that use this layer can exchange data with each other.

The SBP-2 protocol exploits the feature of the IEEE1394 standard as a memory bus model. When the SBP-2 protocol is used, the target side can receive data and send out at its convenience. Protocols other than SBP-2 can transfer asynchronously generated data, can realize multi-channels, and so on, but cannot exploit the feature of IEEE1394 as a memory bus model. More specifically, when a certain protocol other than SBP-2 is applied to communications between a host and printer, data from the host cannot be received at the convenience of the printer side, and the host must transfer data while monitoring the printer state.

In SBP-2, upon transferring data, the transmitting side initially performs login operation to establish a channel with a communication partner. In this case, the login side is called an initiator, and the partner side connected to the initiator is called a target. Data is transferred by reading/writing data from/in a buffer of the initiator in accordance with an instruction from the initiator. In this method, the initiator generates an ORB (Operation Request Block) including the address and size of the buffer where data is stored, and the like, and informs the target of the address in the ORB. The target reads out data from the initiator or writes data on the basis of the buffer address or size in the ORB according to its own convenience. After such process, the target generates a status block, and informs the initiator of completion status.

When a communication is made using the SBP-2 protocol built on the IEEE1394 interface, especially, when a data source such as a host computer or the like is used as an initiator and data is transferred to a peripheral device such as a printer device or the like which serves as a target, the following four problems are posed.

(Problem 1) A complicated sequence is required due to full-duplex communications.

In SBP-2, data transfer is basically managed by the initiator, and the target cannot asynchronously transfer data to the initiator. More specifically, in ordered model of SBP-2, when the target wants to transfer data to the initiator, it issues unsolicited status to the initiator and sends a data read request. In response to this request, the initiator generates an ORB, and adds the generated ORB to the end of a list of outstanding ORBs (including a data transfer request from the initiator to the target, and the like). Since those ORBs are processed in turn from the head of the list, the ORB corresponding to read request that is issued by the target to the initiator is processed not at its issuance timing but only after the ORB process of the initiator progresses, and the ORB generated in response to the data read request from the target is processed. Then, the target transfers data to the initiator. Hence, two-way asynchronous data transfer cannot be done. For this reason, when data to be transferred from the target to the initiator is generated asynchronously, data to be immediately sent to the initiator is not guaranteed to be sent in finite period. For example, when the target is a printer and an error has occurred in that printer, the initiator cannot be informed of the error because the execution of target is blocked by the error.

For this reason, in order to promptly transfer data asynchronously generated in the printer to the host, a login procedure must be performed using the printer as the initiator, and data transfer having the host computer as the target must be done.

In such situation in which the host computer and printer log in each other and serve as both the initiator and target, processes as the initiator and target must be equipped in both the host computer and printer. Also, the login operation must be performed from the printer.

A peripheral device such as a printer which processes images consumes many memory resources and processor resources to attain image processing. For this reason, in order to simplify the device arrangement and to reduce cost or to attain quick processing, resources used for purposes other than image processing must be eliminated as much as possible. However, when many processes must run, as described above, more resources are consumed accordingly contrary to these objects, i.e., a cost reduction and efficient processing.

For example, in case of the host computer and printer, data that flow in the respective directions can be associated with each other, e.g., print data and its processing status. However, when channels are set by independent logins in the respective directions, print data and its response must retain correspondence to each other, and another processing sequence must be added for this purpose.

As described above, direct application of IEEE1394 and SBP-2 to communications between the host computer and printer is improper, and makes it hard to reduce resources required in the respective devices and to improve efficiency.

(Problem 2) Multi-channels cannot be realized.

Recently, a hybrid machine that combines various functions has prevailed as a peripheral device. For example, a digital hybrid machine which can be used as a standalone scanner, printer, or facsimile by, e.g., a host computer, is available. Upon using such device, a plurality of functions can be simultaneously used if communications are made via a plurality of independent channels in units of independent functions.

However, since SBP-2 cannot provide multi-channels, it is hard to simultaneously use such independent functions.

(Problem 3) SBP-2 cannot cope with bus reset.

In the IEEE1394 interface, upon a status change that changes the network configuration, such as new attachment or disattachment of a device to an IEEE1394 serial bus, or power ON or OFF of the attached device, bus reset is generated. The bus reset is generated when a node that has detected the aforementioned status change on the bus transmits a bus reset signal onto the bus. The generated bus reset signal is transmitted from one node to another, and when all nodes on the network have received the bus reset signal, a series of operations for bus reset are executed in each node.

In this way, bus reset is generated asynchronously with the processes in the nodes on the network. On the other hand, even in a given node which is not related to the node that has caused the bus reset in terms of an application, once the bus reset has been generated, that node must execute the bus reset processing. In the process of bus reset, nodes which are communicating with each other according to SBP-2 are disattached, and even when these nodes are re-attached, it is not guaranteed if the process can be continued from the state immediately before bus reset.

SUMMARY OF THE INVENTION

The present invention has been made in consideration of the aforementioned prior art, and has as its object to provide a communication control method and apparatus, which allow full-duplex communications (asynchronous two-way communications) by a single login process and can efficiently use resources such as processes, memories, and the like required for data exchange, and a printing device using the method.

It is another object of the present invention to provide a communication control method and apparatus which can achieve multi-channels, and a printing device using the method.

It is still another object of the present invention to provide a communication control method and apparatus which can guarantee continuation of processes from a state immediately before bus reset, even when all the tasks in the task set is aborted (Bus reset, target resetm, etc.), and a printing device using the method.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description serve to explain the principles of the invention.

FIG. 9 shows the format of a read command ORB;

FIGS. 10A to 10C show the general format of a status block;

FIG. 12 shows the format of a read status block;

FIGS. 16A and 16B are flow charts of a management sequence of write and read I/O request queues, which is executed by the SHPT processor of the initiator;

DESCRIPTION OF THE PREFERRED EMBODIMENTS

First Embodiment

Figure 24:
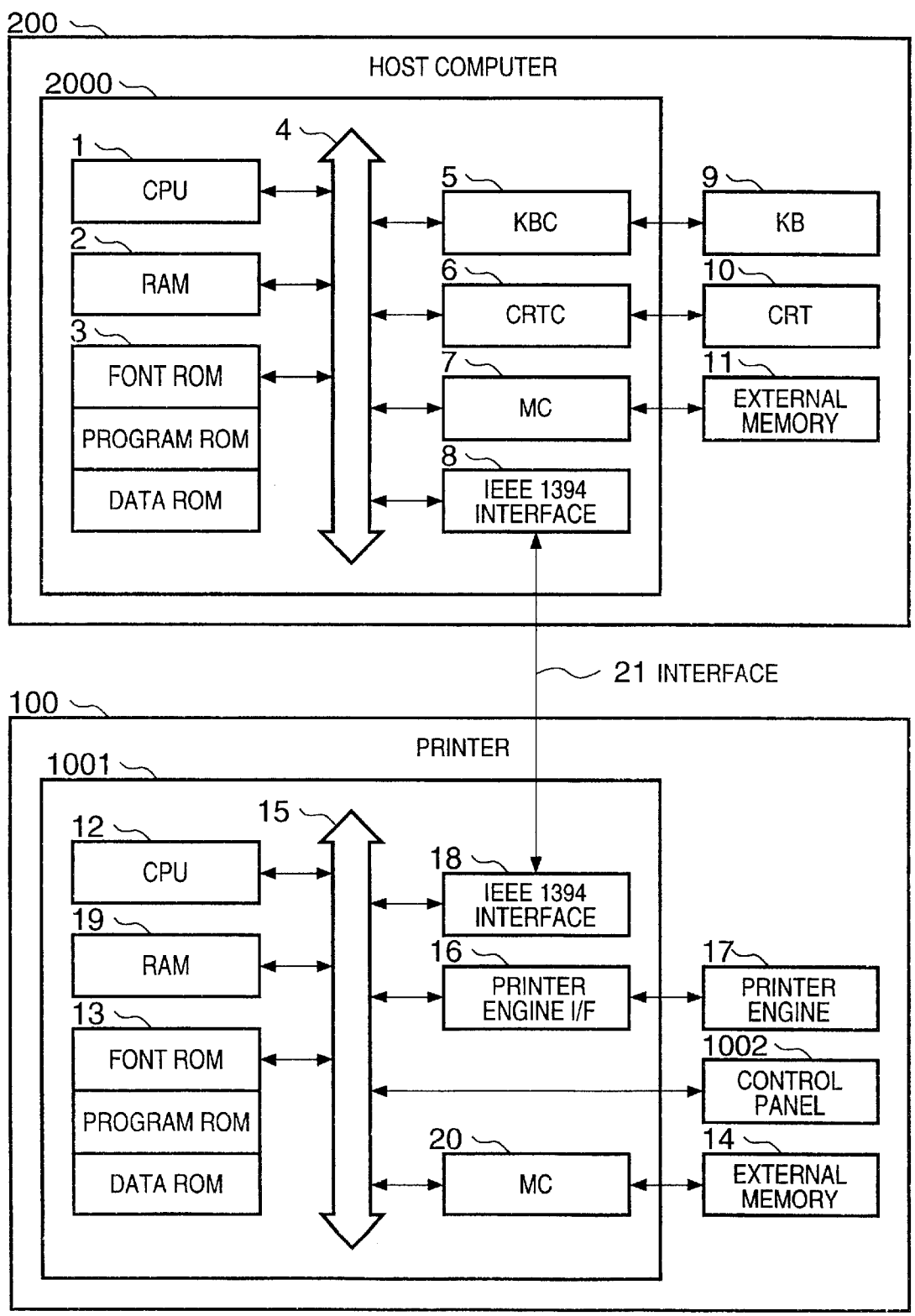
FIG. 24 is a block diagram showing the hardware arrangement of a printer system using an IEEE1394 interface.

A printer system which connects a host computer and printer via IEEE1394 will be explained below as the first embodiment of the present invention. In this printer system, data transfer is done according to a protocol (to be referred to as SHPT hereinafter) according to the present invention, which uses the SBP-2 protocol built on IEEE1394. FIG. 24 is a block diagram showing the hardware arrangement of the printer system.

<Hardware Arrangement of System>

Referring to FIG. 24, a host computer 200 comprises a CPU 1 which executes document processes including figures, images, characters, tables (including spread sheet and so forth), and the like on the basis of a document processing program stored in a program ROM included in a ROM 3. The CPU 1 systematically controls devices connected to a system bus 4. The program ROM in the ROM 3 stores a control program for the CPU 1, and the like, a font ROM included in the ROM 3 stores font data and the like used in the document processes, and a data ROM included in the ROM 3 stores various data used upon executing the document processes and the like. A RAM 2 serves as a main memory, work area, and the like for the CPU 1. A program may be stored in the RAM 2. Also, a transmission data buffer, and a system memory for storing ORBs are assured on the RAM 2.

A keyboard controller (KBC) 5 controls key inputs from a keyboard 9 and a pointing device (not shown). A CRT controller (CRTC) 6 controls display on a CRT display (CRT) 10. A memory controller (MC) 7 controls access to an external memory 11 such as a hard disk (HD), floppy disk (FD), or the like, which stores a boot program, various applications, font data, user files, edit files, and the like. An IEEE1394 interface 8 is connected to a printer 100 according to the IEEE1394 standard, and executes a communication control process with the printer 100. Note that the CPU 1 rasterizes outline fonts onto a display information RAM assured on, e.g., the RAM 2 to realize WYSIWYG on the CRT 10. Also, the CPU 1 opens various registered windows on the basis of command instructions by, e.g., a mouse cursor or the like (not shown) on the CRT 10, and executes various data processes.

In the printer 100, a printer CPU 12 systematically controls access to various devices connected to a system bus 15 on the basis of a control program stored in a program ROM included in a ROM 13, a control program stored in an external memory 14, or the like, and outputs an image signal as output information to a print unit (printer engine) 17 connected via a printer engine interface 16. The program ROM in the ROM 13 stores a control program for the CPU 12, which implements various agents and image processes (to be described later), and the like. A font ROM in the ROM 13 stores font data used upon generating the output information, and the like, and a data ROM in the ROM 13 stores, e.g., information used on the host computer in case of a printer without any external memory 14 such as a hard disk or the like. The CPU 12 can communicate with the host computer via an IEEE1394 interface 18, and can inform the host computer 200 of information in the printer and the like.

A RAM 19 serves as a main memory, work area, and the like of the CPU 12, and its memory size can be extended by an option RAM connected to an extension port (not shown). Note that the RAM 19 is used as an output information rasterizing area, environment data storage area, NVRAM, and the like.

The external memory 14 such as a hard disk (HD), IC card, or the like is access-controlled by a memory controller (MC) 20. The external memory 14 is connected as an option, which stores font data, an emulation program, form data, and the like. Switches for operations, LED indicators, and the like are provided to a control panel 1002. The number of external memories is not limited to one. For example, more than one external memories may be equipped, and a plurality of external memories such as an option font card that stores option font data in addition to internal font data, an external memory that stores a program for interpreting different printer control languages, and the like may be connected. Furthermore, the printer may have an NVRAM (not shown), and may store printer mode setup information set at the control panel 1002.

<Arrangement of Initiator>

Figure 1:
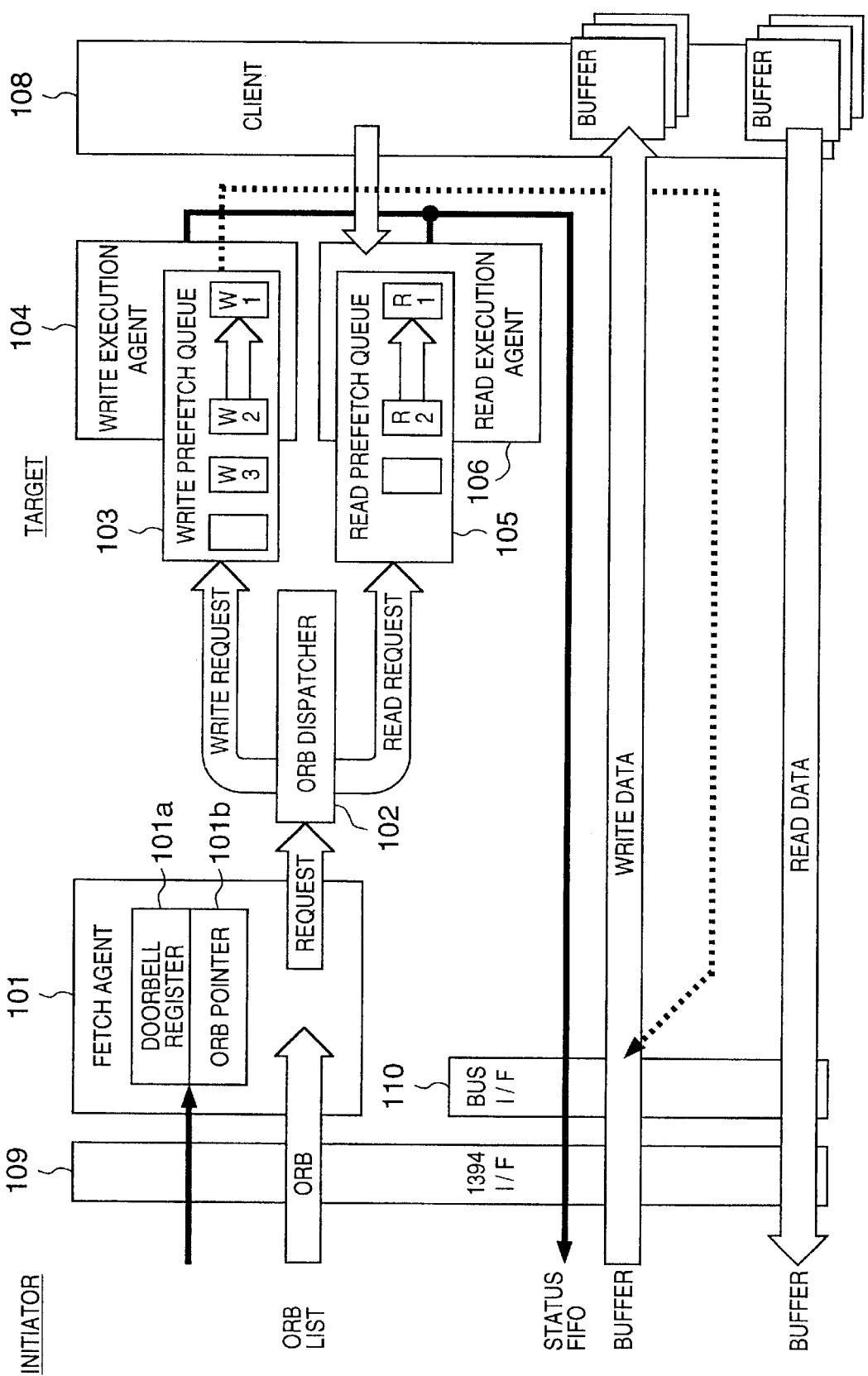
FIG. 1 is a block diagram of a target (printer)
Figure 2:
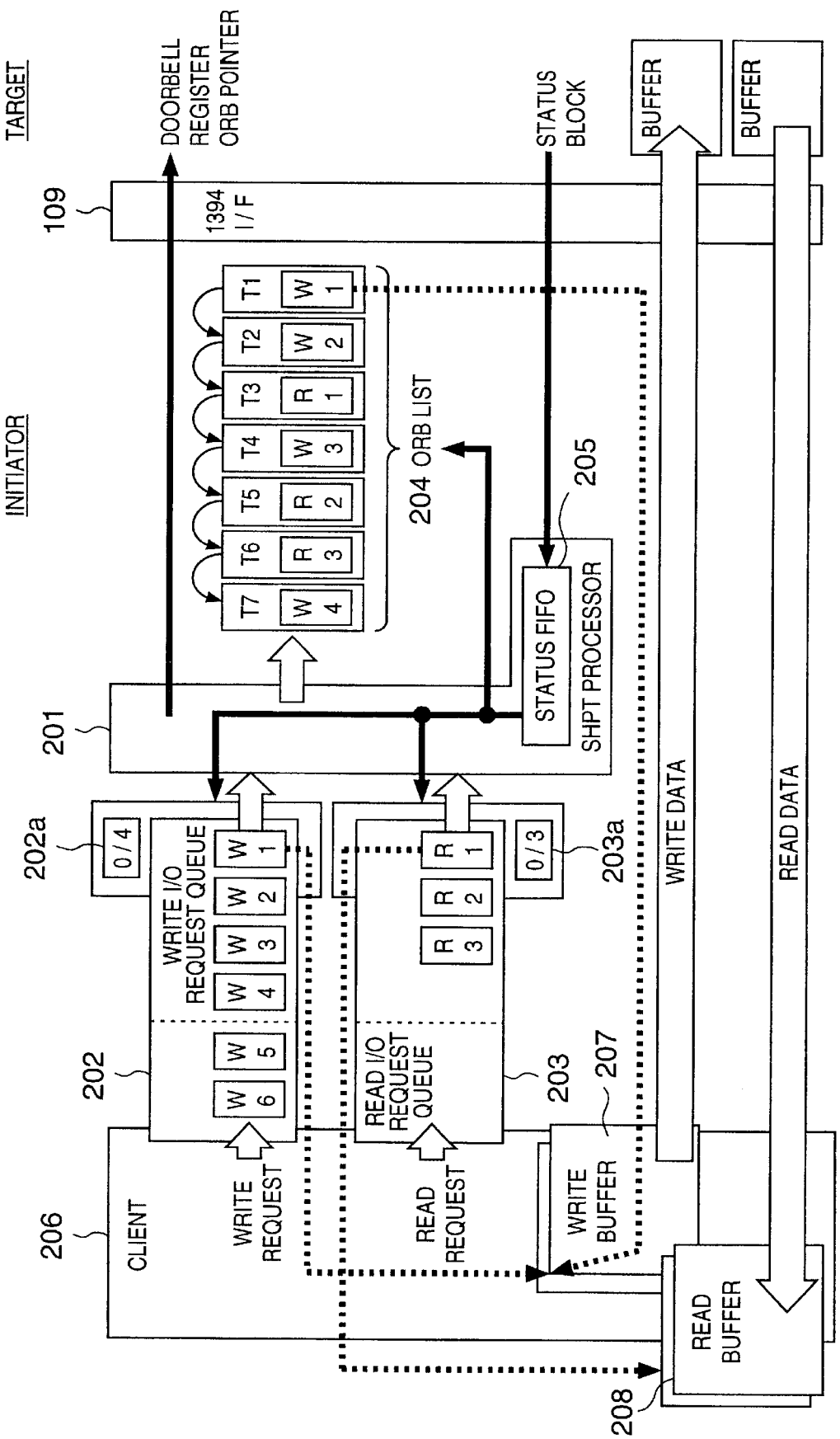
FIG. 2 is a block diagram of an initiator (host computer)

FIGS. 1 and 2 show a communication system which uses the printer 100 as a target and the host computer 200 as an initiator in the aforementioned hardware arrangement. In this embodiment, these arrangements are implemented by executing programs by the CPUs in the host computer and printer. The initiator shown in FIG. 2 will be explained first.

Referring to FIG. 2, in the host computer as the initiator, a client 206 such as a printer driver or the like issues a data transfer request to the printer via an SHPT processor 201, and receives a response from the printer. In this embodiment, the SHPT processor 201 is a software module executed by CPU 1.

The SHPT processor 201 manages I/O request queues and ORBs generated on a system memory. A read I/O request queue 203 enqueues read request commands from the client 206, and a write I/O request queue 202 enqueues write request commands from the client 206. An ORB is a block that stores the address, size, and the like of a data buffer which stores data to be transferred from the host computer as the initiator to the printer as the target, or vice versa, and is linked to an ORB list 204 in turn from the first ORB. The ORB has the following processing rules.

(1) An ORB is generated in turn from a command read out from the head of each of the read and write I/O request queues, and is added to the end of the ORB list 204. The read/write order is not particularly limited.

(2) An ORB is fetched in turn from the head of the ORB list. Upon reception of a status block from the target, an ORB corresponding to that status is removed from the ORB list.

(3) The upper limit number of ORBs that can be linked is equal to the total of the sizes (including commands whose processing is underway) of read and write prefetch queues (to be described later) in the target.

Rules (1) and (2) guarantee that read and write I/O requests are issued to the target in the respective order of generation. Rule (3) guarantees that an I/O request in the ORB list is transferred to the target. To implement rule (3), the SHPT processor 201 has two counters for each of two prefetch queues in the printer. One of these counters is a counter 203a named CurrentReadQUE, which indicates maximum number of commands that the read prefetch queues can store and the current free size of the read prefetch queue (to be described later) in the target. The other counter is a counter 202a named CurrentWriteQUE, which indicates maximum number of commands that the write prefetch queues can store and the current free size of the write prefetch queue in the target. The initial values of these counters are held in a device which is serving as the target, and are loaded from the target and stored in the initiator upon, e.g., login. The number of these counters increases/decrease in correspondence with generation/deletion of ORBs.

Upon generation of an ORB, the initiator informs the target of generation of the ORB by writing some value in a register called a doorbell register in the target, or writing the address of the head ORB in the list in a register called an ORB pointer. When the ORB list includes a pending ORB, and a new ORB is added to the end of the ORB list, the some value is written in the doorbell register. When a new head ORB is generated while the ORB list is empty, its address is written in the ORB pointer. This procedure is specified in SBP-2.

The SHPT processor 201 includes a status FIFO 205. Status received via an IEEE1394 interface 109 is processed by the SHPT processor 201. The SHPT processor 201 removes an ORB corresponding to the received status from the ORB list 204, and also removes a command corresponding to that ORB from the corresponding I/O request queue.

The host computer serving as the initiator has the aforementioned functional arrangement.

<Arrangement of Target>

FIG. 1 is a block diagram showing the functional arrangement of the printer serving as the target. Referring to FIG. 1, a doorbell register 101a is written with a given value by the initiator. A data write to the doorbell register indicates generation of a new ORB. An ORB pointer 101b is written with the address of a newly generated ORB by the initiator. A fetch agent 101 fetches an ORB pointed by the ORB pointer via an IEEE1394 interface 101 when a value is written in the doorbell register 101a. An ORB dispatcher 102 adds a write command to the end of a write prefetch queue 103 if the ORB fetched by the fetch agent 101 is a write command ORB, or adds a read command to the end of a read prefetch queue 105 if that ORB is a read command ORB. The type of command is determined in accordance with the value in a function field of the ORB.

Write and read execution agents 104 and 106 respectively read out commands enqueued in the write and read prefetch queues 103 and 105 in a FIFO manner, and execute data writes to or data reads from a buffer in the initiator. After that, each agent sends back normal status to the host computer.

Note that the read execution agent 106 writes data in a buffer in the initiator, which is designated by a read command in the read prefetch queue, in accordance with a data transfer request from a client 108 such as a rasterizer or the like, which generates raster data by interpreting and executing PDL. Such data transfer request is originated from the target asynchronously with read and write commands from the initiator. For this reason, the initiator always enqueues a read command in the read command prefetch queue using a read command ORB. The target can transfer data to the initiator anytime it wants as long as a read command is enqueued in the prefetch queue. Note that a bus interface 110 is used for accessing a desired memory location of a system memory 208 in the host computer 200 as the initiator from the printer 100 as the target.

The arrangements and operations of the initiator and target have been briefly explained. Prior to a detailed description of them, the contents of an ORB will be explained in detail below.

<Contents of Command ORB (Operation Request Block)>

FIGS. 7A and 7B show the general format of an ORB. Referring to FIG. 7A, a "Next_ORB" (link) field 301 stores a link to the next ORB. If there is no next ORB, a predetermined value indicating it is stored in this field. Note that the head ORB is indicated by a predetermined address register. A "data_descriptor" field 302 indicates the address of a data buffer. A "d" (direction) field 303 indicates data transfer from the host computer to the printer (0: write) or data transfer from the printer to the host computer (1: read). A "data_size" field 304 indicates the size of a data buffer indicated by the address field 302. The fields (including those which are not explained yet) above the dotted line are specified in SBP-2, and fields 305 to 308 to be described below are used in processes unique to SHPT.

A combination of "PSID" field 305a and "SSID" field 305b indicate channel IDs used. A "function" field 306 indicates the type of ORB, as shown in FIG. 7B. 0H indicates a write command, and 40H a read command.

A "t" (tag) bit 307 indicates a data tag. A "seq_ID" (sequence ID) field 308 is a sequential identifier which is assigned in the generation order of ORBs in units of functions (read or write commands). In this embodiment, this identifier is incremented by one every time an ORB is generated. Note that a counter which serves as a reference for giving a value to this sequence ID field is assured on an area which is not influenced by bus reset, or other failures. This is because the target processes are premised on the continuity of sequence IDs. A control block field 309 stores various values depending on the value in the function field 306 and a function implemented by the target in correspondence with each function. Note that the address and size of a buffer are obtained from a command inserted in each I/O request queue upon generation of an ORB. The ORB contents will be explained below in units of functions.

(Write Command ORB)

Figure 8:
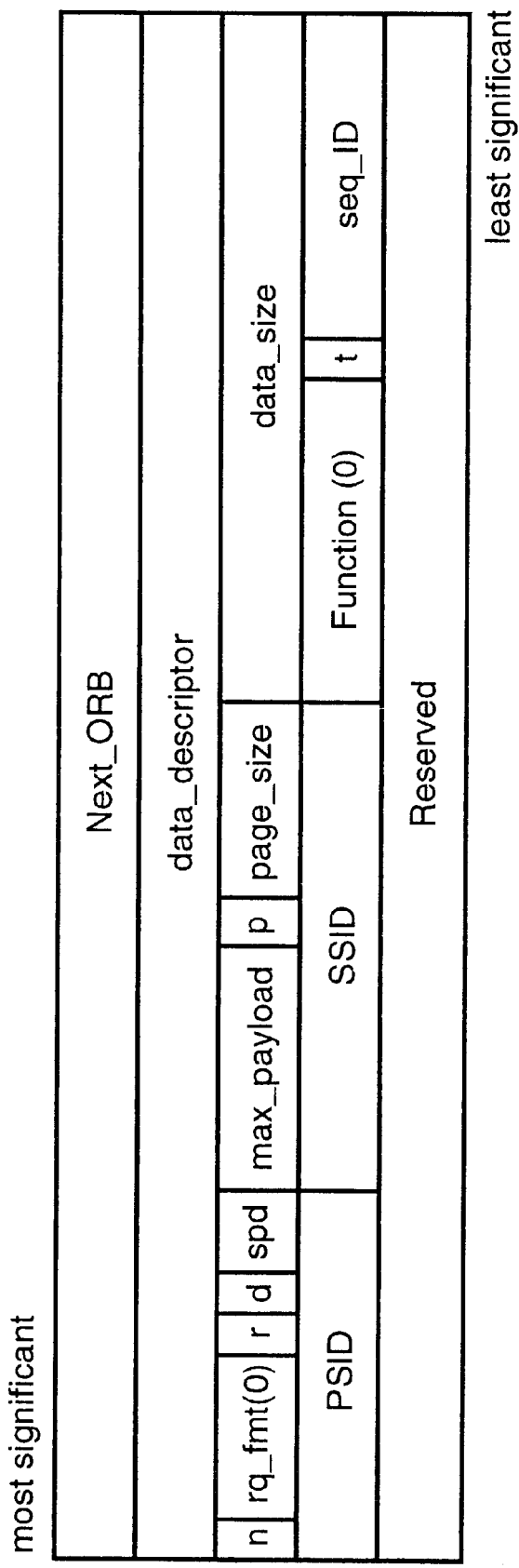
FIG. 8 shows the format of a write command ORB.

FIG. 8 shows a write command ORB with function=0H. This command is used for transferring data in a designated buffer from the initiator to the target. The value in the function field is 0H, and a sequence ID is given to each write command in ascending order for each channel.

(Read Command ORB)

FIG. 9 shows a read command ORB with function=40H. This command is used by the initiator to read out data from the target. The value in the function field is 40H, and a sequence ID is given to each read command in ascending order for each channel.

(Status Block)

Figure 10A:
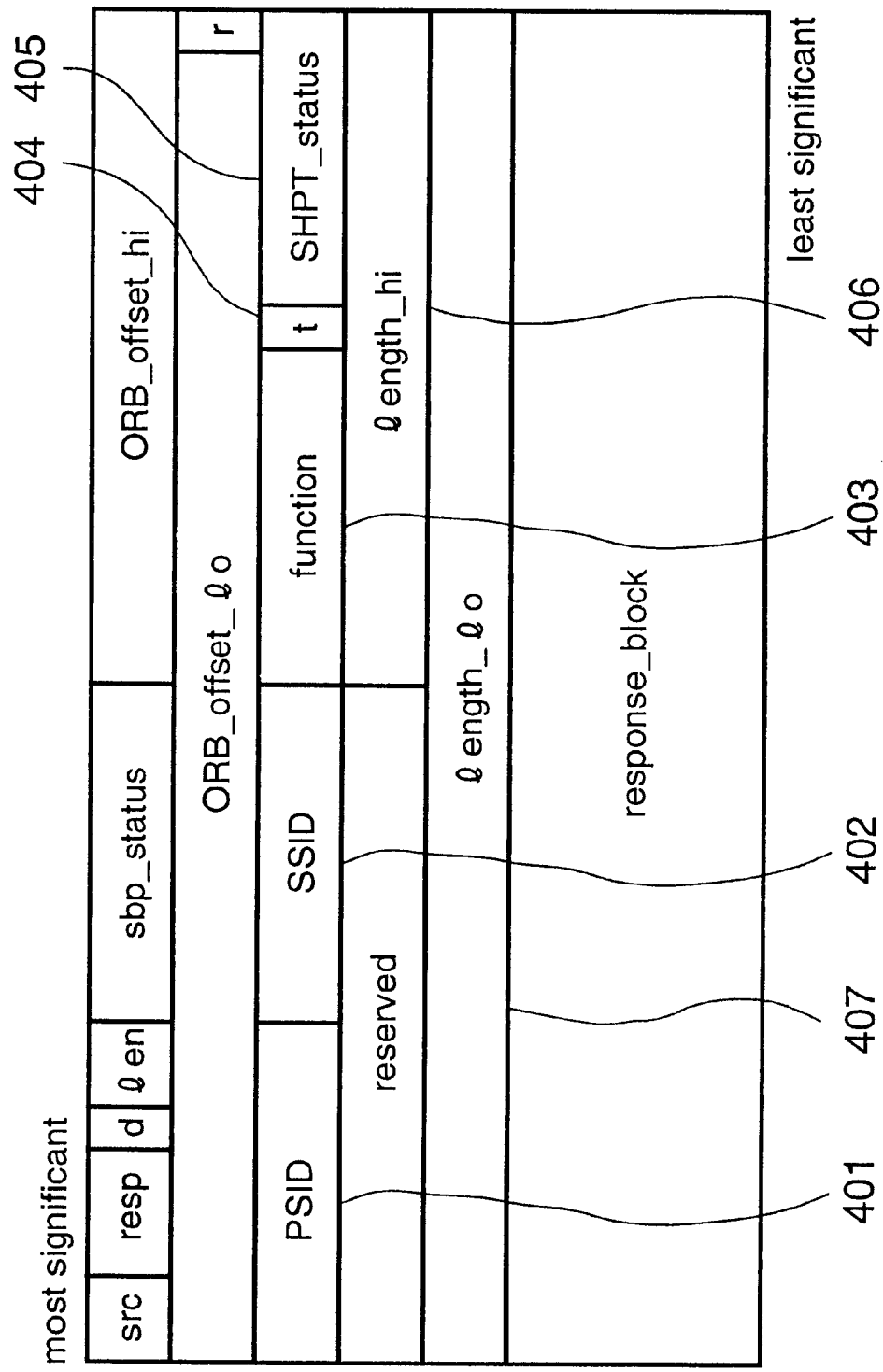

FIGS. 10A to 10C show the format and contents of status sent back from the target to the initiator. Referring to FIG. 10A, since fields above the dotted line are those specified in SBP-2, a detailed description thereof will be omitted. A PSID field 401, SSID field 402, function field 403, and tag field 404 are the same as those in the command ORB shown in FIG. 7. FIG. 10B shows the values and meanings in the function field.

An "SHPT_status" (SHPT status) field 405 has meanings shown in FIG. 10C. More specifically, if the stored value is 0, this field indicates that processes of a command ORB corresponding to that status are complete. For example, if the corresponding command ORB is a write command, a status block including SHPT status=0 means that the target has read out all data from a buffer indicated by the corresponding write command ORB, and has written them in a buffer of the target. On the other hand, if the stored value is 1, the field indicates that only some of processes of the corresponding command ORB are complete. If the stored value is 2, processes of the corresponding command ORB are canceled due to an error. Upon reception of this error status, the initiator executes an error process by, e.g., informing the client of the error.

A "length_hi" (length high) field 406 and "length_lo" (length low) field 407 indicate the data lengths of processed data.

(Write Status Block)

Figure 11:
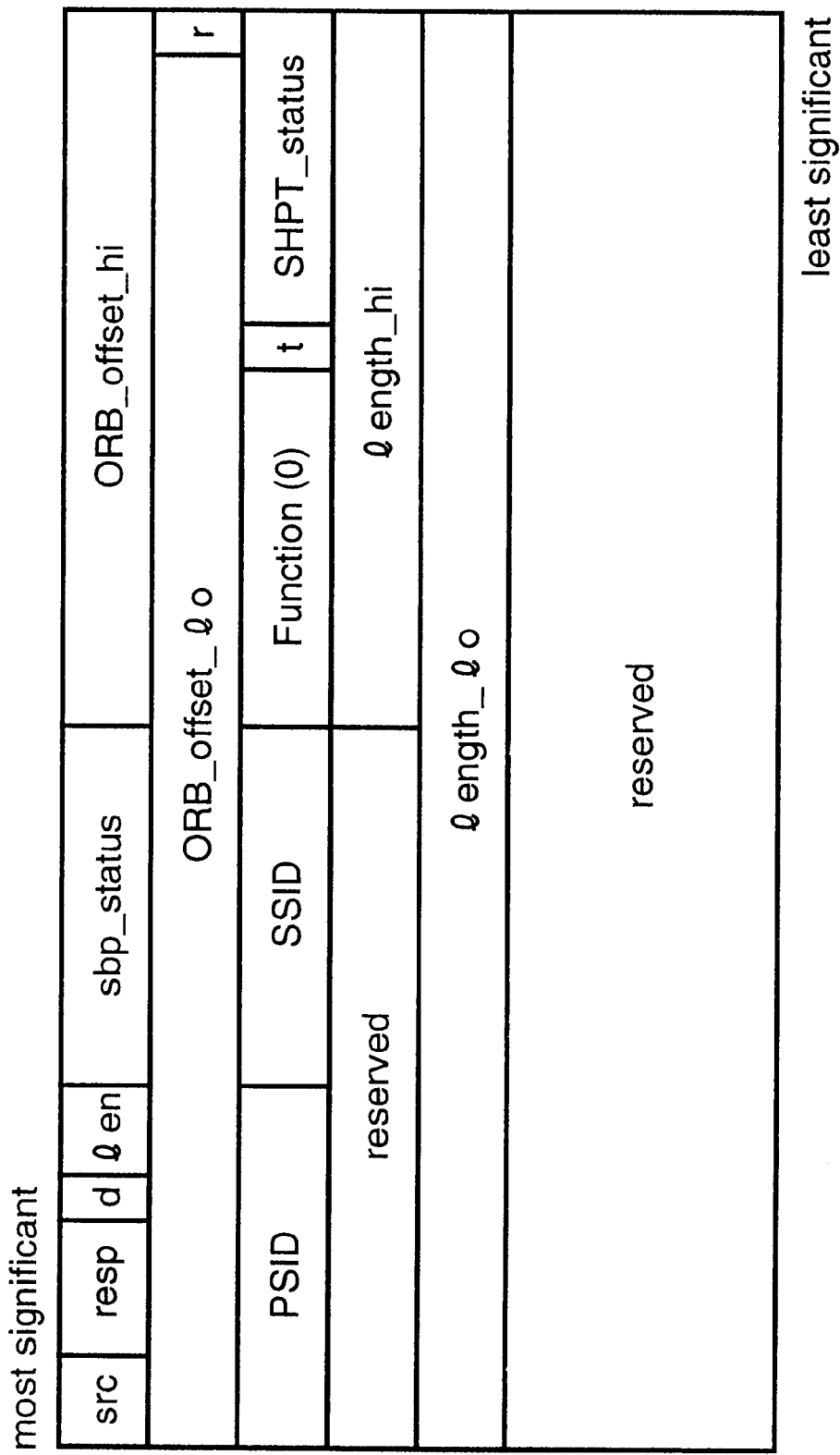
FIG. 11 shows the format of a write status block.

FIG. 11 shows a write status block with function=0, which is passed from the target to the initiator in response to a write command. The processing state is represented by SHPT status, as shown in FIG. 10C.

(Read Status Block)

FIG. 12 shows a read status block with function=40H, which is passed from the target to the initiator in response to a read command. The processing state is represented by SHPT status, as shown in FIG. 10C.

<ORB Management>

How ORBs are used will be explained below on the basis of the arrangements of the initiator and target and the formats of the command ORBs and status blocks mentioned above.

Figure 3:
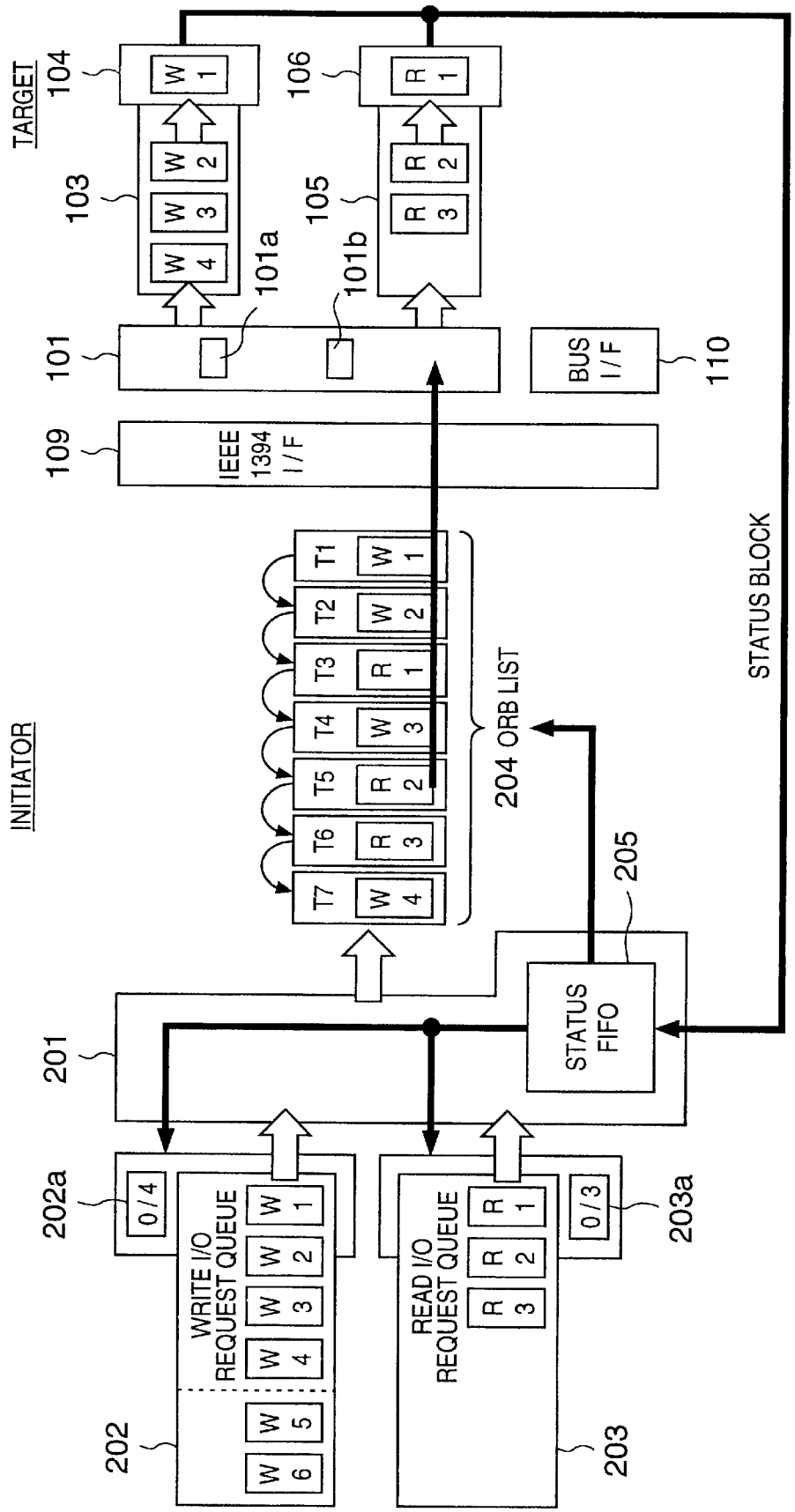
FIG. 3 is a diagram showing an example of a state of queues between the initiator and target.

FIG. 3 shows the flow of commands between the initiator and client. A write command will be explained first. Upon generation of a data transfer request from the client of the initiator, the client adds a write command including the address and size of a buffer that stores data to be transferred to the target to the end of the write I/O request queue 202. The SHPT processor 201 checks the CurrentWriteQUE 202a indicating the free size of the write prefetch queue 103 in the target. If the write prefetch queue has a free space, the SHPT processor 201 generates an ORB based on that write command and links it to the end of the ORB list 204. If the write prefetch queue 103 has no free space, the processor 201 waits until a free space forms. In the state shown in FIG. 3, since the write prefetch queue 103 is full of write commands W1 to W4, and write commands W5 and W6 issued after those commands are enqueued in the write I/O request queue 202. Note that a write command corresponding to a newly generated ORB is removed from the write I/O request queue not at the time of generation but upon reception of completion status from the target.

After the SHPT processor 201 adds the generated ORB to the ORB list, it writes some value in the doorbell register 101a in the target or writes the address of the new ORB in the ORB pointer 101b via the IEEE1394 interface. The dispatcher 102 (not shown in FIG. 3) adds a write command to the end of the write prefetch queue 103 on the basis of that ORB. The write execution agent 104 sequentially executes commands in the write prefetch queue 103. More specifically, the write execution agent 104 needs the contents from the initiator's buffer indicative of the write command and write them in a buffer prepared by the client of the target. Upon completion of the command process, the write execution agent writes a status block with SHPT status= "completion" in the status FIFO 205 of the initiator.

The SHPT processor 201 status blocks written in the status FIFO 205 from the head one. More specifically, if SHPT status is "completion", the SHPT processor 201 removes an ORB corresponding to that status block from the ORB list, and dequeues a corresponding write command from the write I/O request queue. The same procedure mentioned above applies to read commands. However, a read command is not processed unless data to be read is generated in the target. Hence, a read command ORB issued from the initiator is kept enqueued in the read prefetch queue 105 until data to be read is generated.

When the initiator is a host computer and the target is a printer, and the host computer passes print data to the printer, the printer driver as the client of the initiator passes print data to the rasterizer as the client of the target using the aforementioned write command. On the other hand, when the host computer requests information that indicates the configuration or status of the printer, it passes a command indicating that to the printer using a read command. Upon receiving the command, the printer (the client thereof) passes the requested data to the host computer using a read command enqueued in the read prefetch queue 105. Furthermore, when an error has occurred in the printer, the client of the printer can spontaneously pass error information to the host computer using a read command enqueued in the read prefetch queue 105. For this purpose, the host computer issues at least one read ORB to the printer while it is being connected to the printer, in terms of operation. Furthermore, in order to always enqueue read commands in the read prefetch queue, the host computer preferably issues at least two read ORBs to the printer.

Figure 6:
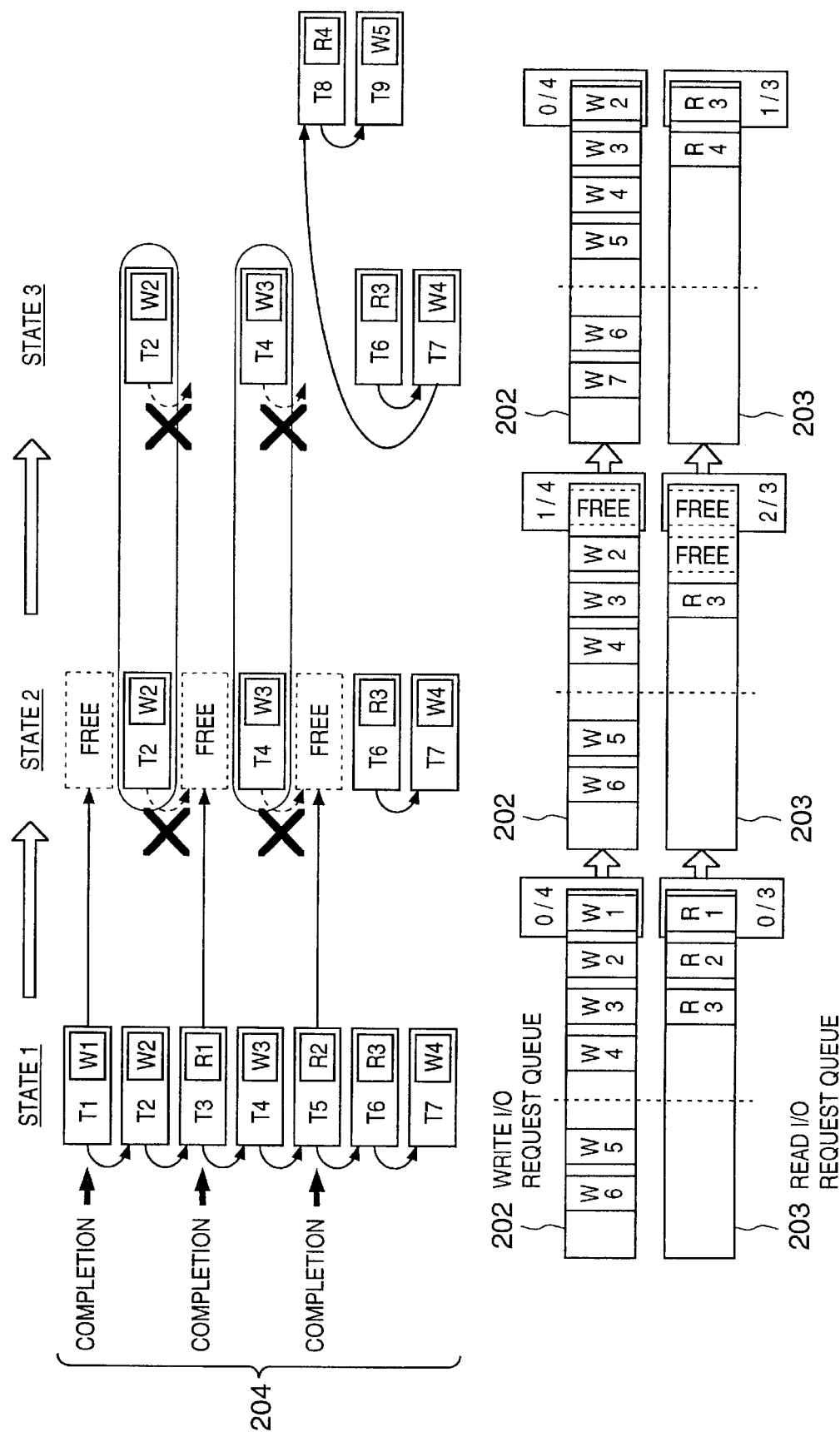
FIG. 6 is a chart showing an example of processes removing an ORB from an ORB list in the initiator.

FIG. 6 shows the updating process of the ORB list. In state 1, write command ORBs W1 to W4 and read command ORBs R1 to R3 are linked to the ORB list to have ORB W1 as the head one. From state 1, write command W1 and read command R1, (then R2) are processed, and their ORBs are deleted from the ORB list (state 2). For this reason, the link destinations of write ORBs W2 and W3 disappear. In this case, since these ORBs have already been fetched to the target, they need not be linked to the ORB list again. Also, even when these ORBs are not present in the ORB list, since their corresponding commands are left in the I/Q request queues, an error recovery process (to be described below) can be normally executed.

<Error Recovery (Initiator)>

As has already been described above, in SBP-2, the connection between the initiator and target is disconnected by bus reset. Hence, SHPT specifies a procedure for recovering the state lost by bus reset. The outline of that procedure will be explained below with reference to FIGS. 4 to 6.

Figure 4:
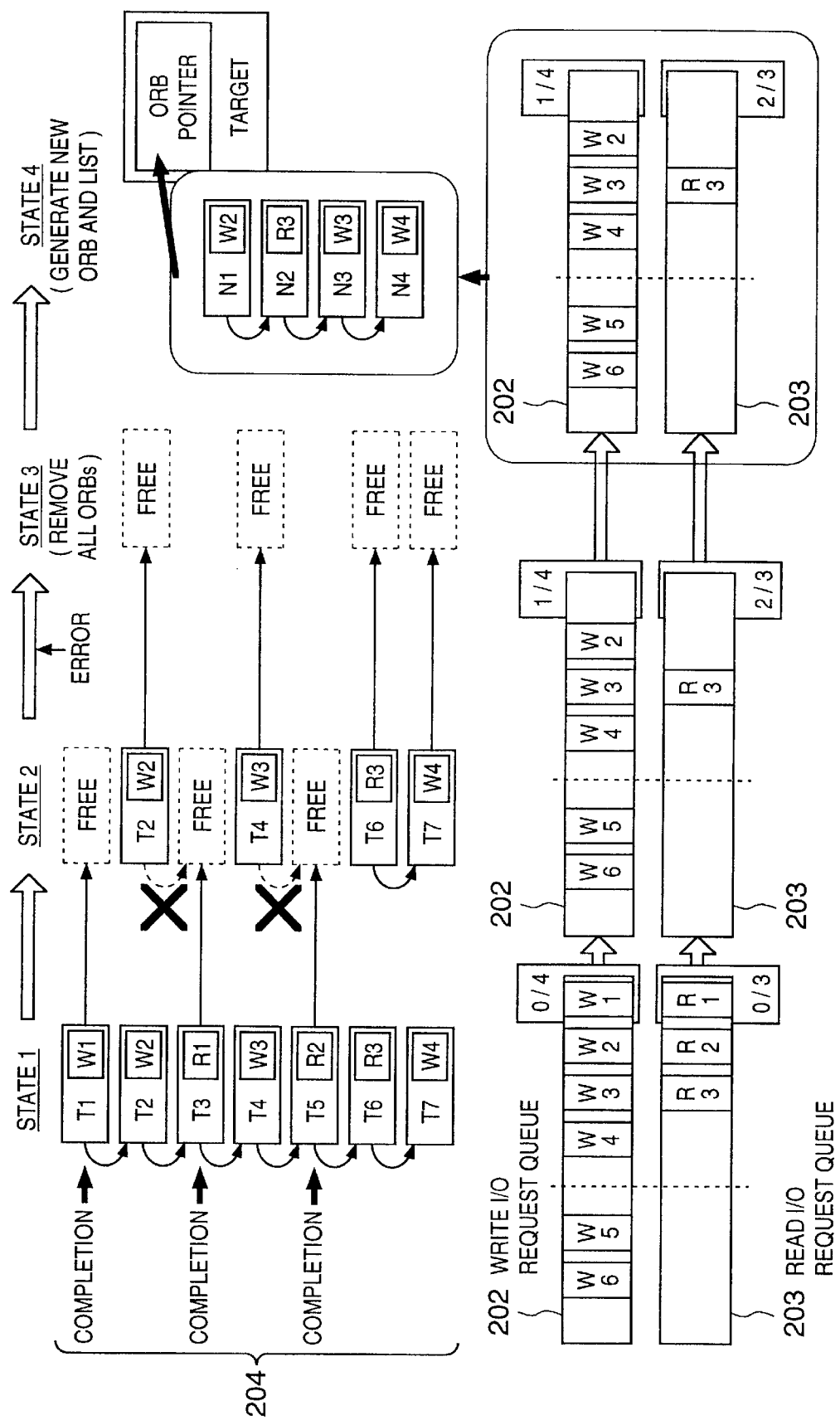
FIG. 4 is a chart showing an example of recovery processes after bus reset in the initiator.

FIG. 4 shows the states of the ORB list and I/O request queues in the initiator. Referring to FIG. 4, in state 1, write ORBs of write commands W1 to W4, and read ORBs of read commands R1 to R3 have been issued, and write commands W5 and W6 are enqueued in the write I/O request queue 202. When the target processes one write command W1 and two read commands R1 and R2, the initiator transits to state 2. The ORBs corresponding to the processed commands are removed from the ORB list 204 and form free areas. In this state, the write prefetch queue has a free space but no ORB corresponding to write command W5 is issued yet.

Assume that bus reset has occurred. Upon completion of bus reset processes, all ORBs are deleted from the ORB list (state 3). The write I/O request queue 202 and read I/O request queue 203 are never reset even upon bus reset.

After a connection is re-set, the initiator generates new ORBs with reference to the contents of the write I/O request queue 202 and read I/O request queue 203 and links them to ORB linked list and rings door bell register. This is state 4. If some mark or the like is assigned to a corresponding command upon generation of an ORB, the state immediately before bus reset can be recovered.

Although not shown in FIG. 4, the contents of the status FIFO need not be recovered since it is not influenced by bus reset.

<Error Recovery (Target)>

Figure 5:
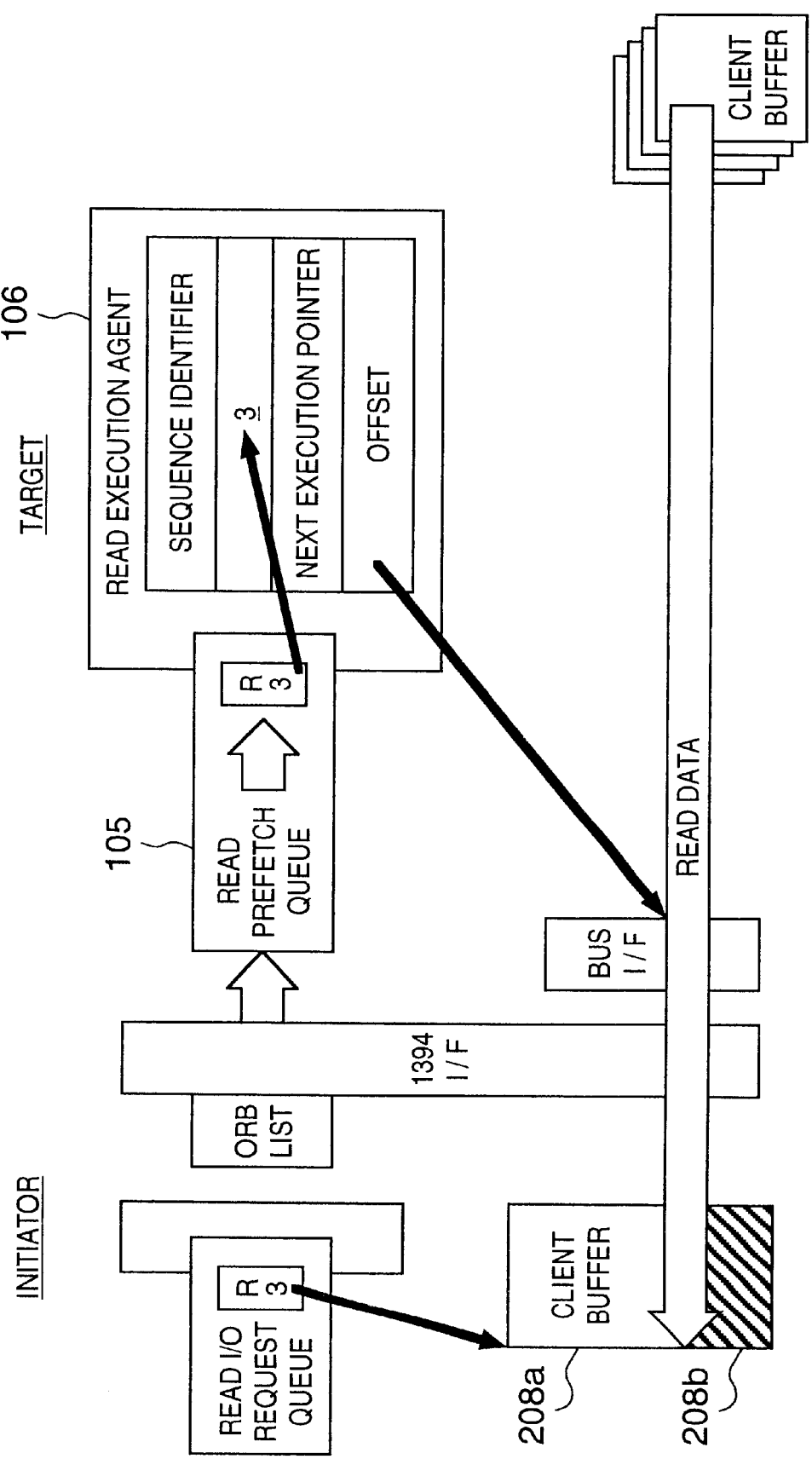
FIG. 5 is a chart showing an example of recovery processes after bus reset in the target.

FIG. 5 shows the recovery processes after bus reset on the target side. The initiator can restore the state immediately before bus reset by recovering only the ORB list. However, since the target reads/writes with respect to a buffer in response to a read/write command, if bus reset has taken place during read/write, the target must continue the access attempt after recovery. For this purpose, the read/write execution agent of the target stores a command whose process is underway, and the location in a buffer whose process is in progress.

FIG. 5 exemplifies a case of read command. The initiator issues a read ORB, and the target processes that ORB using the read execution agent. Before the execution, the read execution agent 106 reads out the contents of the seq_ID field of the read ORB to be processed, and stores the contents as a sequence identifier (Sequenceidentifier). In FIG. 5, the stored value is "3". Upon writing data in a buffer of the initiator, the address of the buffer in which data is being currently written is kept updated as an execution pointer (Nextexecpointer). In FIG. 5, that value is "offset". These areas are assured on a memory area, which is not deleted by bus reset.

Upon completion of reconnection, since the initiator issues ORBs again, if the contents of the seq_ID field of the head ORB in the read prefetch queue are older than the stored sequence identifier, the read execution agent returns completion status without execution since that ORB has already been processed. If the contents of the seq_ID field match the stored sequence identifier, the write continues from the address indicated by Nextexecpointer.

As for write commands, recovery is done in the same manner as described above.

The commands and status used in the print system of this embodiment have been explained. Command and status processing sequences in the initiator and target will be explained below.

<Data Transfer Request by Client of Initiator>

Figure 13:
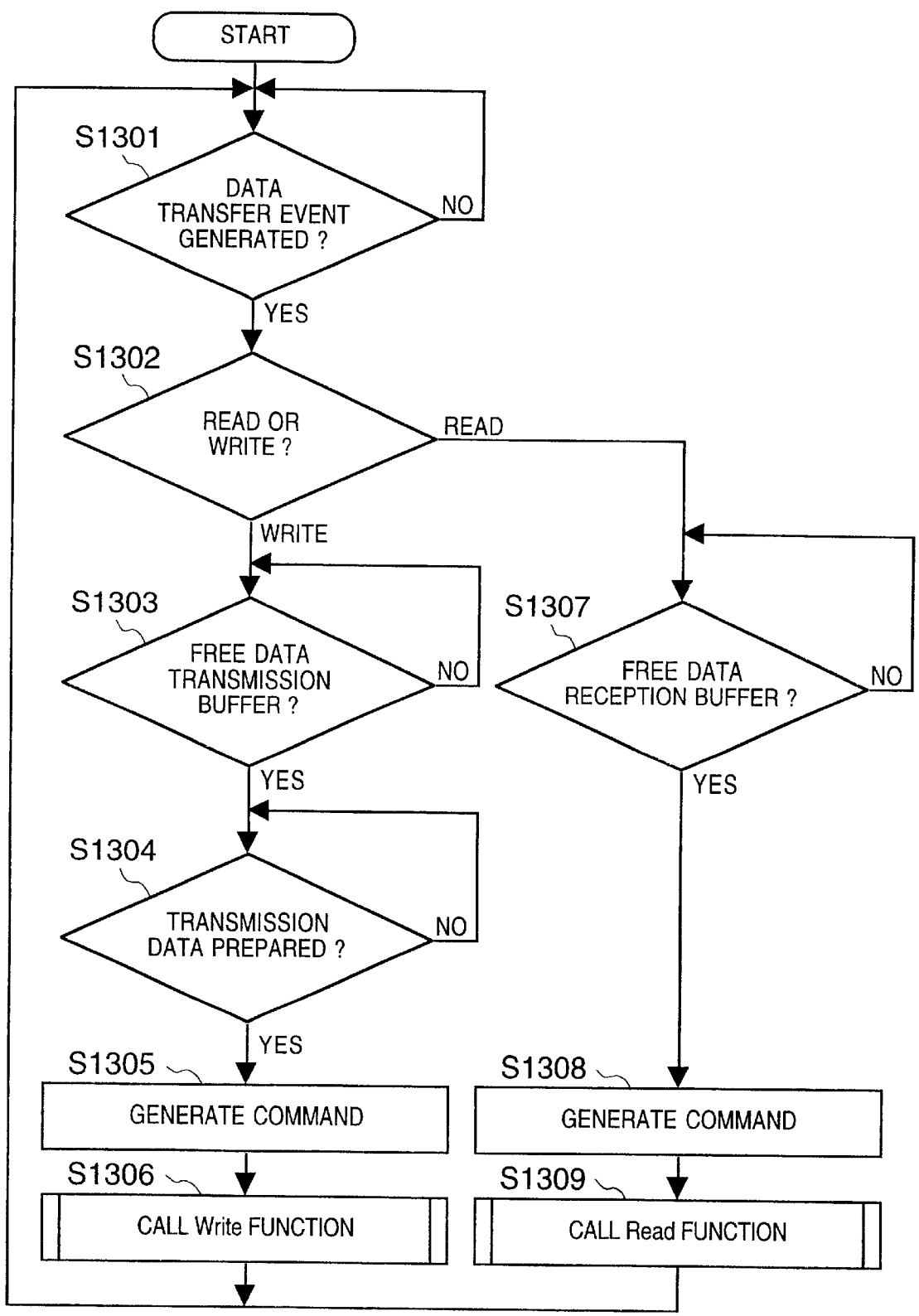
FIG. 13 is a flow chart showing a processing sequence executed upon generation of a data transfer request by a client of the initiator.

FIG. 13 shows the sequence when the printer driver or the like as a client of the initiator transmits or requests data to the target.

Upon generation of a data transfer event (step S1301), it is checked if a command required for that event is a read or write command (step S1302). If a write command is required, it is checked if there is a free data transfer buffer for that write (step S1303), and it is also checked if transmission data to be transmitted to the target is ready (step S1304). If YES in steps S1303 and S1304, a write command is generated by giving required arguments such as an address and size of a buffer, and the like (step S1305), and a write function is then called (step S1306).

On the other hand, if it is determined that a read command is required, it is checked if there is a free transfer buffer for receiving data (step S1307). If YES in step S1307, a read command is generated by giving required arguments such as an address and size of a buffer, and the like (step S1308), and a read function is called (step S1309).

For example, upon transmitting print data to the printer, a write command must be generated by preparing a client-level command and data such as PDL and the like on a buffer. On the other hand, upon reading status from the printer, a read command for receiving data from the target must be generated. Also, prior to exchanging a series of data with the target, the client of the initiator issues some read commands.

Figure 14:
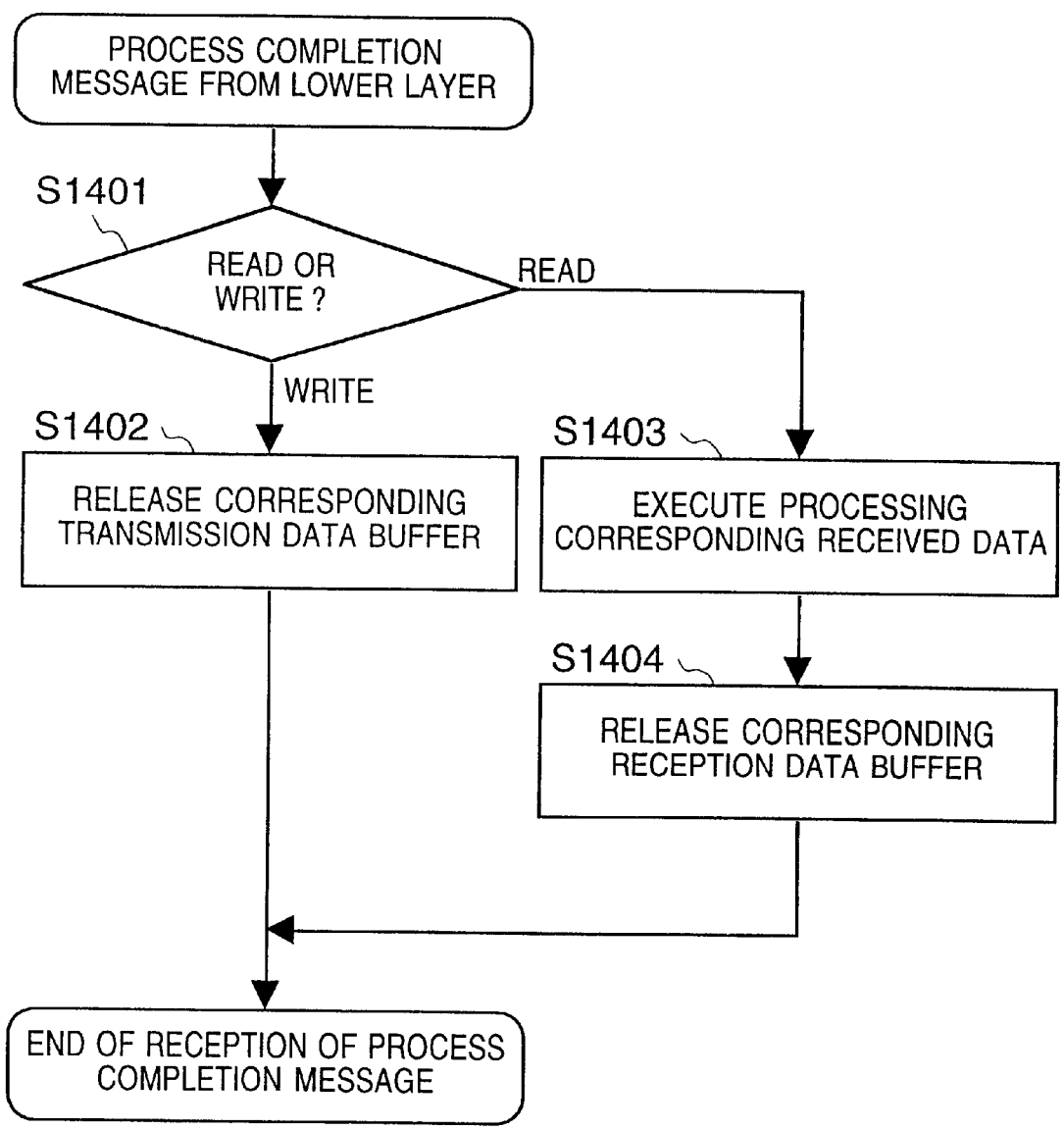
FIG. 14 is a flow chart showing the processing sequence executed when the client of the initiator receives a process completion message from SHPT.

FIG. 14 shows the processing sequence executed when a client of the initiator receives a process completion message from a lower layer, i.e., the SHPT layer. It is checked if the completed process is a read or write process (step S1401). If a write process is complete, the data buffer used is released (step S1402). On the other hand, if a read process is complete, since the process ends upon completion of data reception, a process corresponding to the received data is done (step S1403), and the data buffer is released (step S1404).

<Processing by SHPT Processor of Initiator>

Figure 15A:
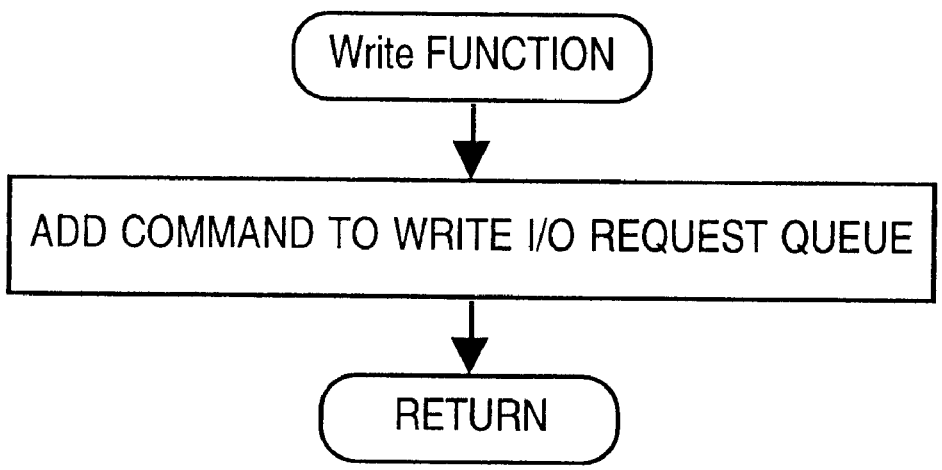
FIGS. 15A and 15B are flow charts of write and read functions, which are executed by an SHPT processor of the initiator and are called from the client.
Figure 15B:
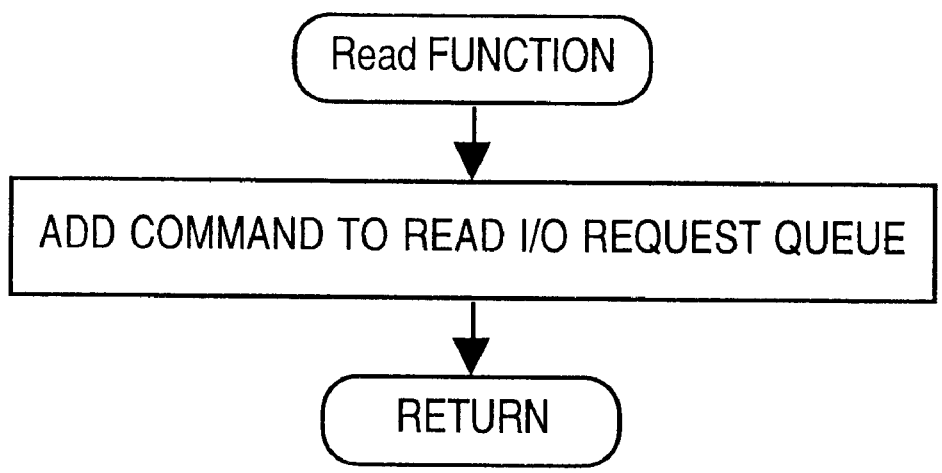

FIGS. 15A to 18 show the processing sequences executed by the SHPT processor of the initiator. FIGS. 15A and 15B show the contents of the write and read functions called by a client. In the write function, a write command is enqueued in the write I/O request queue. In the read function, a read command is enqueued in the read I/O request queue.

(I/O Request Queue Management)

FIGS. 16A and 16B respectively show the write and read I/O request queue management sequences. These sequences are executed respectively. Since the processing contents of these sequences are substantially the same except for different objects to be managed, i.e., the read and write I/O queues, only the write I/O request queue management sequence will be explained below. Note that the read I/O request queue management sequence is explained by replacing the write I/O request queue by the read I/O request queue, the counter CurrentWriteQUE by CurrentReadQUE, and step numbers S160x by 161x in the following description.

It is checked if the write I/O request queue includes a non-ORB-converted command (step S1601). If such command is found, it is checked if the counter CurrentWriteQUE indicating the free size of the prefetch queue in the target is larger than 0, i.e., if there is a free area (step S1602). If a free area is found, the value CurrentWriteQUE is decremented by 1 (step S1603), and an ORB is generated by appending a sequence ID (Seq_ID) and SHPT command (Function) on the basis of the head command which is stored in the write I/O request queue and not yet converted into an ORB (step S1604).

The generated ORB is linked to the ORB list (step S1605), and a given value is written in the doorbell register in the target or the address of the generated ORB is written in the ORB pointer (step S1606). In this manner, an ORB is generated based on a command in the I/O request queue.

(Processing for Status Block)

Figure 17:
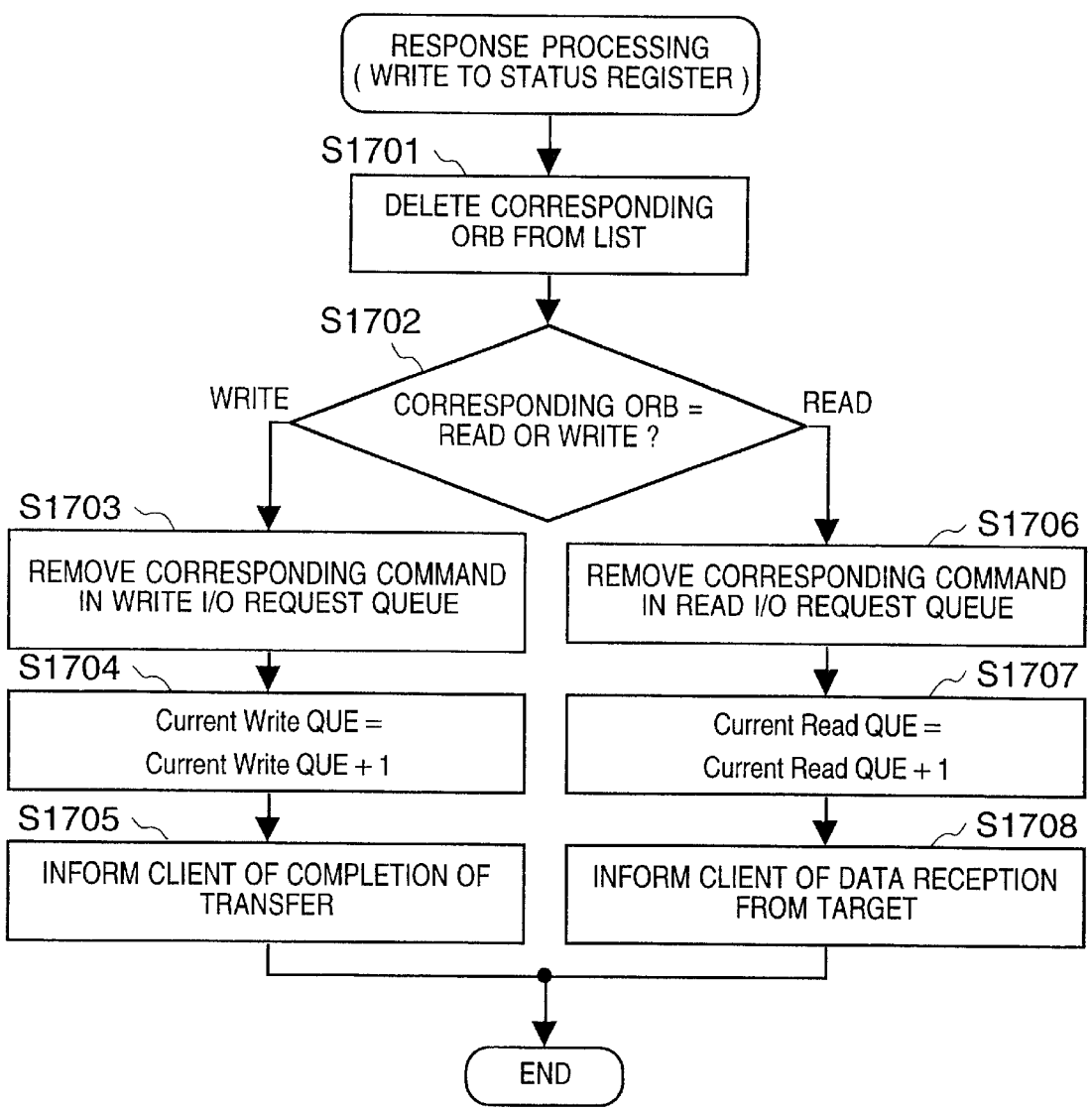
FIG. 17 is a flow chart showing a processing sequence executed by the SHPT processor of the initiator upon reception of a status block.

FIG. 17 shows the processing sequence executed upon reception of a status block from the target. Upon receiving a status block indicating completion of processing for an ORB, the corresponding ORB is deleted from the ORB list (step S1701), and it is checked if the corresponding ORB is a write or read command ORB (step S1702). If a write command ORB is deleted, a command as the source of the deleted ORB is dequeued from the write I/O request queue (step S1703). Since a free area is to be formed in the prefetch queue in correspondence with the completed processing in the target, the counter CurrentWriteQUE is incremented by 1 (step S1704). Finally, the client is informed of completion of processing (step S1705). Upon reception of this information, the client executes the processing shown in FIG. 14.

On the other hand, if it is determined in step S1702 that the corresponding ORB is a read command ORB, a command as the source of the deleted ORB is dequeued from the read I/O request queue (step S1706). Since a free area is to be formed in the prefetch queue in correspondence with the completed processing in the target, the counter CurrentReadQUE is incremented by 1 (step S1707). Finally, the client is informed of completion of processing (step S1708).

(Error Recovery Process)

The normal processes of the SHPT processor have been explained. A recovery sequence after, e.g., bus reset will be explained below with reference to FIG. 18. When bus reset has occurred and the connection to the target is disconnected, the connection is set up again.

A link process of a new ORB is interrupted (step S1801), and the ORB list is discarded (step S1802). After that, a re-connection command is output (step S1803), and it is checked if the connection is re-established (step S1804). If the connection is established again, ORBs are generated in the order from head commands in the write and read I/O request queues (step S1805). The generated ORB is linked to the ORB list (step S1806), and its address is written in the ORB pointer (step S1807), thus informing the target of generation of the ORB.

On the other hand, if a predetermined period of time has elapsed before connection can be set up again, all commands in the write and read I/O request queues are discarded (step S1809), and the client is informed of abnormality (step S1810), thus ending the processing.

With the above-mentioned sequence, the connection to the target can be established again after reset, and the ORB list immediately before reset can be recovered.

<Processing by Target>

Figure 19:
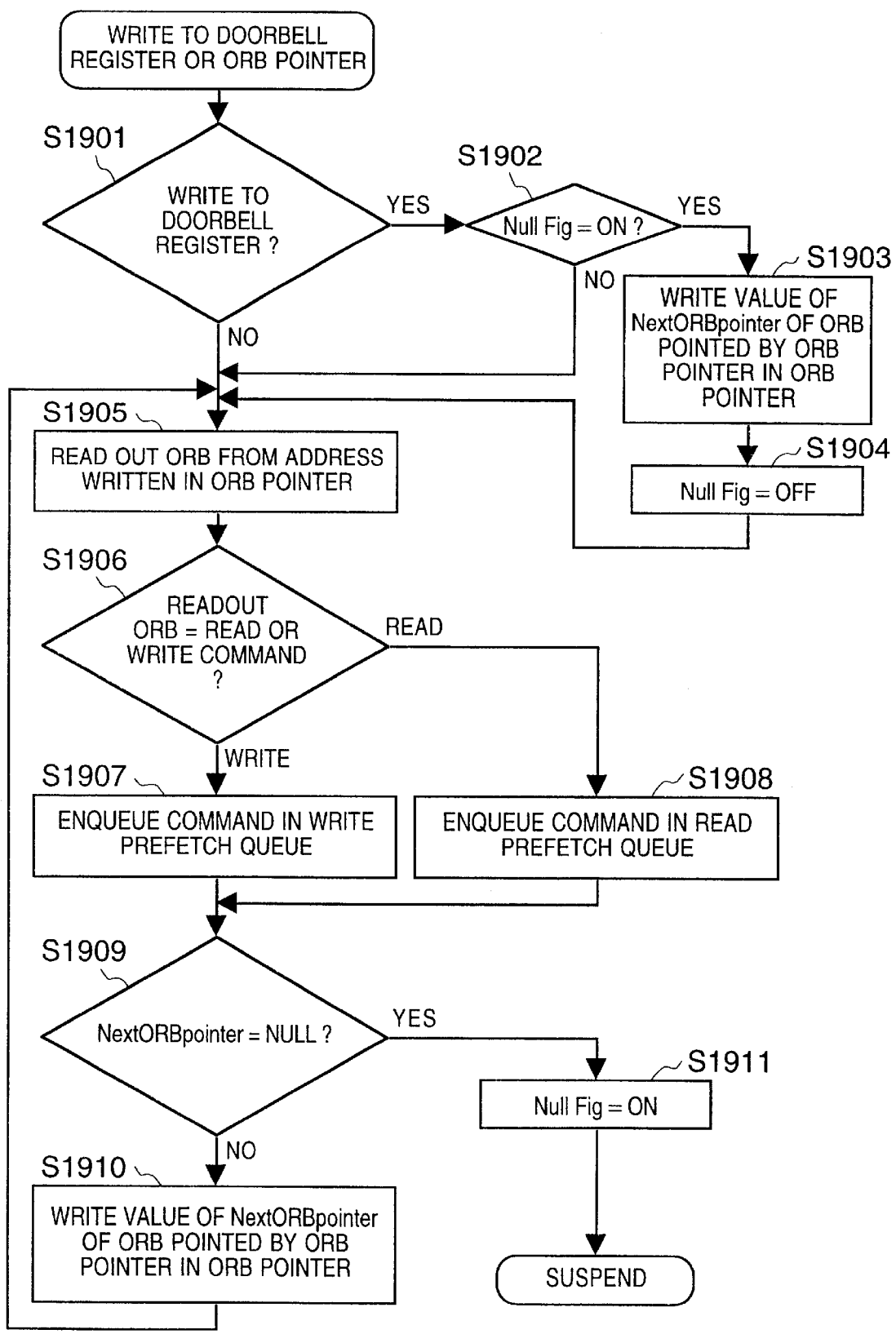
FIG. 19 is a flow chart showing a processing sequence by a fetch agent of the target upon writing in a doorbell register or ORB pointer.
Figure 20:
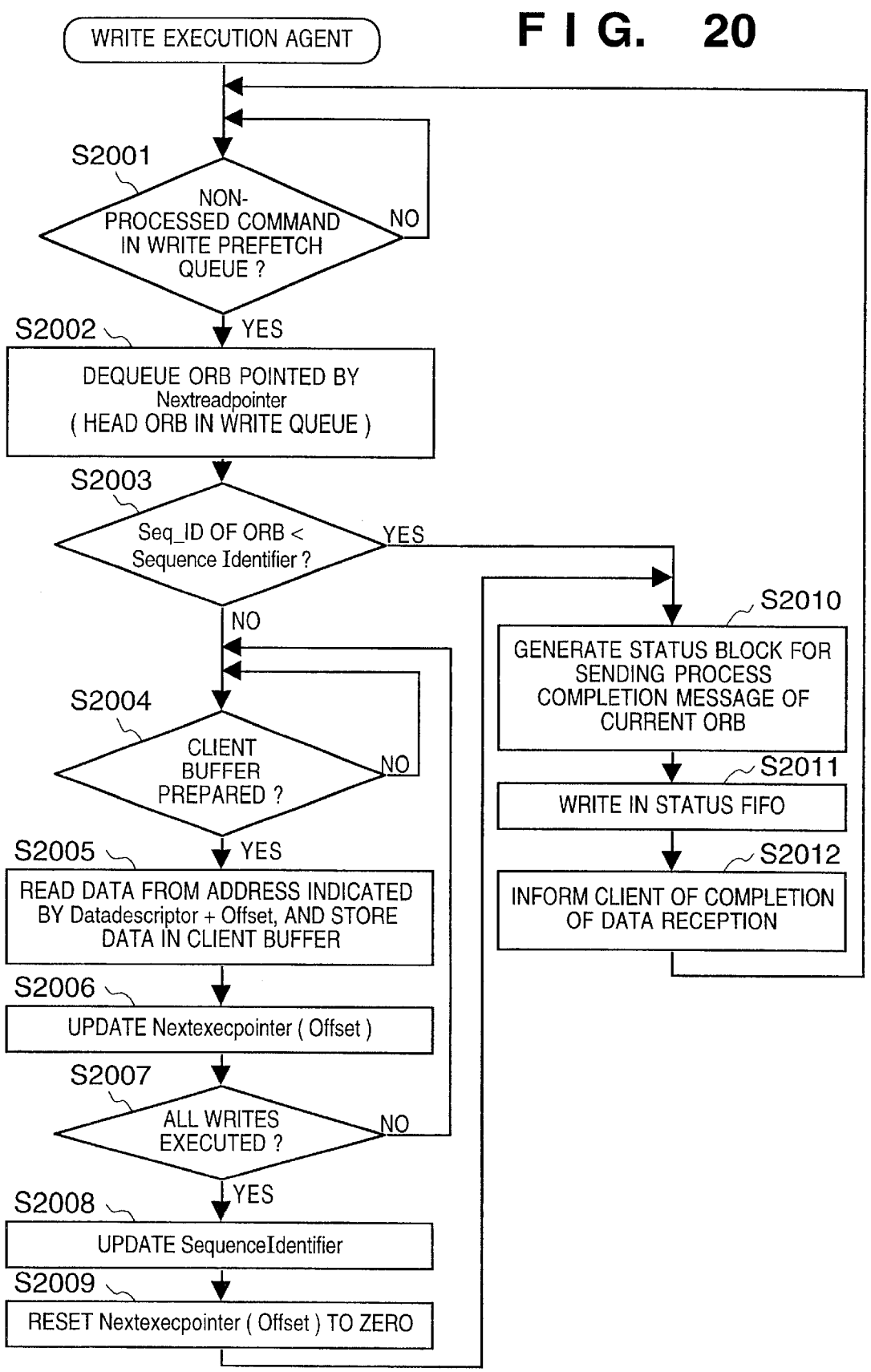
FIG. 20 is a flow chart showing a processing sequence by a write execution agent.
Figure 21:
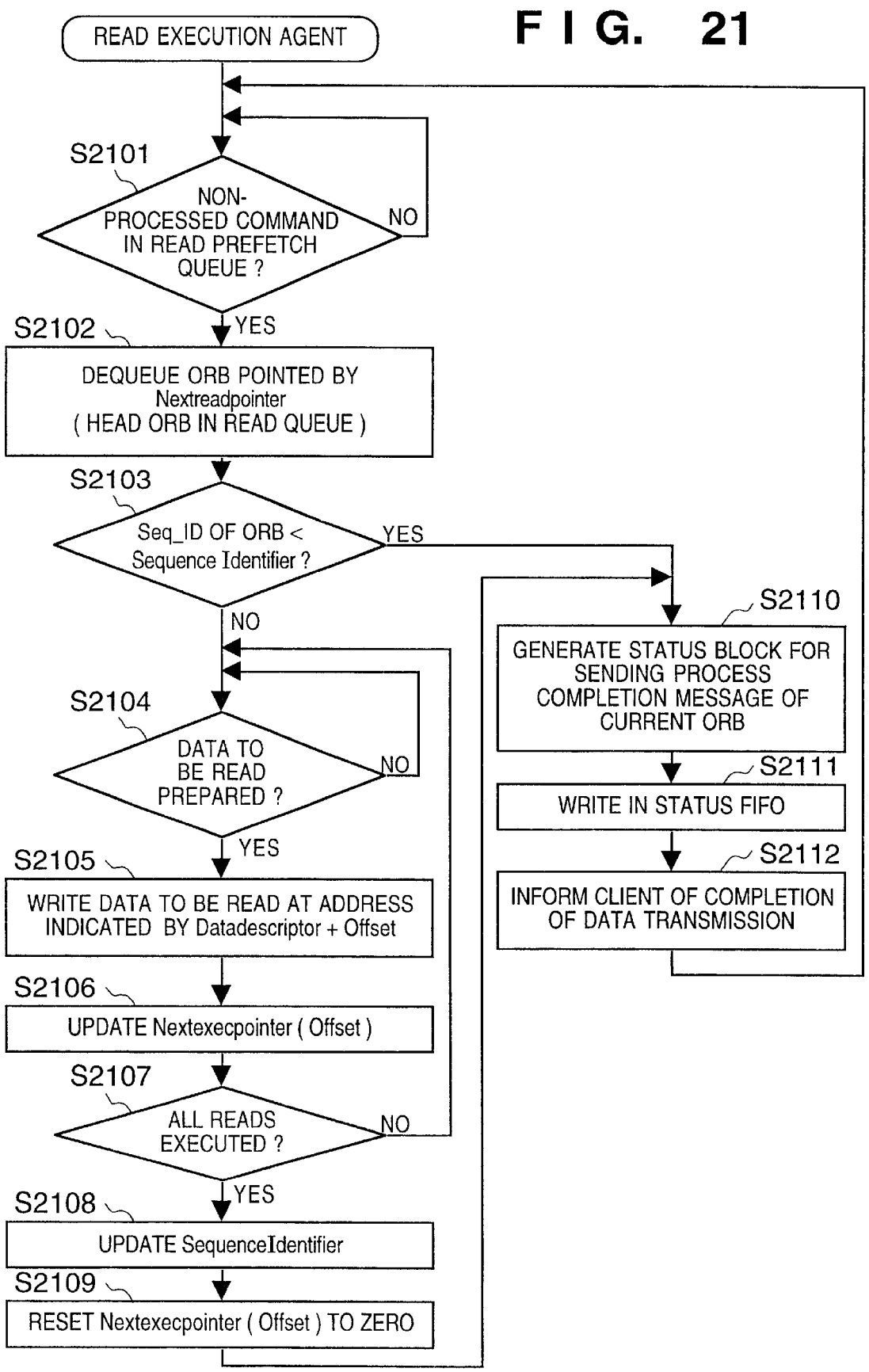
FIG. 21 is a flow chart showing a processing sequence by a read execution agent.

FIGS. 19 to 21 show the processing sequences executed by the target that received an ORB.

(Processing by Fetch Agent)

Upon writing data in the doorbell register or ORB pointer, the fetch agent fetches ORBs. It is checked if the fetch agent is started by a write in the doorbell register (step S1901). If NO in step S1901, i.e., if the fetch agent is started by a write in the ORB pointer, the flow advances to step S1905. On the other hand, if the fetch agent is started by a write in the doorbell register, a flag Nullflg is tested (step S1902). This flag indicates that an effective value is not set in the ORB pointer. If Nullflg is OFF, since the ORB address to be processed is written in the ORB pointer, the flow advances to step S1905. If Nullflg is ON, the value in the Next_ORB field of an ORB pointed by the current ORB pointer is written in the ORB pointer (step S1903), and Nullflg is reset to OFF (step S1904).

If the ORB address to be processed is obtained in the ORB pointer in this way, an ORB is read out from that address (step S1905). It is checked with reference to the function field of the readout ORB if its SHPT command is a read or write command (step S1906). If the SHPT command is a write command, a write ORB is enqueued in the write prefetch queue (step S1907); otherwise, a read ORB is enqueued in the read prefetch queue (step S1908).

After that, if it is determined with reference to the Next_ORB field of the processed ORB that its contents are Null, i.e., no succeeding ORB is linked, the flag Nullflg is set ON, and the control waits for a write to the doorbell register or ORB pointer. On the other hand, if a linked ORB is found, the value in the Next_ORB field in the ORB pointed by the ORB pointer is written in the ORB pointer (step S1910). This sequence repeats itself until all ORBs linked to the ORB list are inserted in the prefetch queue.

In this manner, ORBs in the ORB list are inserted in the prefetch queue. The processes in steps S1906 to S1908 correspond to those described as the ORB dispatcher in FIG. 1.

(Write Execution Agent)

The write execution agent checks if the write prefetch queue includes a non-processed write command (step S2001). If a non-processed write command is found, an ORB pointed by Nextreadpointer is read out from the write prefetch queue (step S2002). Note that Nextreadpointer is a pointer that points to the head ORB in the queue. After the ORB is read out, it is checked if the value in the Seq_ID field of that ORB is smaller than variable Sequenceidentifier held by the write execution agent (step S2003). Note that Seq_ID and Sequenceidentifier have a finite number of digits. If both Seq_ID and Sequenceidentifier are expressed by n bits, the comparison in step S2003 assumes $((2^n-1)<0\ (=2^n))$.

In a normal sequence, upon completion of processing of one ORB, Sequenceidentifier is incremented by 1, as will be described later. Also, Sequenceidentifier and Seq_ID in the ORB have the same number of digits, and Sequenceidentifier is incremented by 1. For this reason, when the processing progresses without any errors, Sequenceidentifier and Seq_ID in the ORB must match each other in step S2003. Hence, if the processing progresses normally, the flow advances from step S2003 to step S2004.

It is checked in step S2004 if the client has prepared a buffer. If a buffer is prepared, data of a predetermined size is read out from an address obtained by adding a DataDescriptor value of the ORB and an offset value stored in Nextexecpointer held by the write execution agent, and is stored in the buffer prepared by the client (step S2005). When the ORB is processed for the first time, since offset=0, data is read out from the start address of the buffer indicated by the ORB. When data is to be read out from the buffer from which data has already been read out halfway through, since offset indicates the next address in the buffer, the read can proceed from the next address by adding offset. After the data is stored in the buffer, Nextexecpointer is updated so that the DataDescriptor value+offset indicates the next read address (step S2006). Such read is done until the size indicated by data_size in the ORB is reached (step S2007).

Upon processing one ORB, Sequenceidentifier is incremented by 1 (step S2008), and Nextexecpointer (offset) is reset to 0 (step S2009).

Also, a status block that informs the initiator of completion of processing is generated (step S2010), and is written in the status FIFO (step S2011). Then, the client of the target is informed of completion of reception (step S2012).

Figure 18:
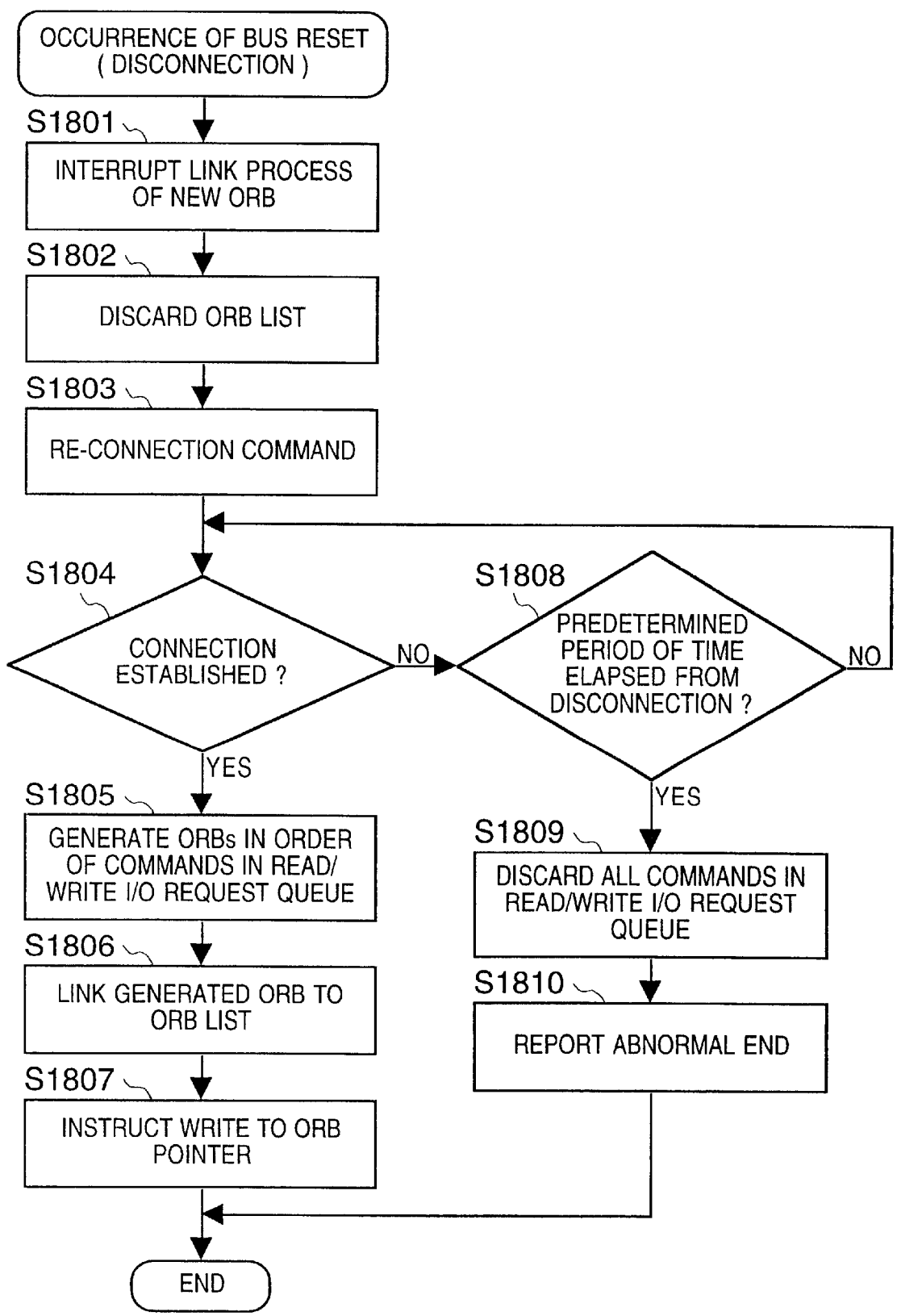
FIG. 18 is a flow chart showing a recovery processing sequence immediately after bus reset, which is executed by the SHPT processor of the initiator.

On the other hand, when the initiator recovers the ORB list in the sequence shown in FIG. 18 after bus reset or the like, it is determined in step S2003 that Seq_ID in the ORB is smaller than Sequenceidentifier. For example, even when the target has processed a given ORB and has updated the value of Sequenceidentifier, if bus reset occurs before that status block reaches the initiator, the initiator places that ORB in the ORB list. In this case, Sequenceidentifier of the execution agent becomes larger than Seq_ID of the ORB. In such case, since that ORB has been processed, the status block is passed to the initiator in step S2010 and the subsequent steps.

(Read Execution Agent)

The read execution agent checks if a non-processed read command is included in the read prefetch queue (step S2101). If a non-processed read command is found, an ORB indicated by Nextreadpointer is read out from the read prefetch queue (step S2102). This Nextreadpointer has the same name as that of the write execution agent but is independently assured in a different area. Note that Nextreadpointer is a pointer indicating the head ORB in the queue. After the ORB is read out, it is checked if the value in the Seq_ID field of that ORB is smaller than variable Sequenceidentifier held by the read execution agent (step S2103). This variable Sequenceidentifier has the same name as that of the write execution agent but is independently assured in a different area. Seq_ID and Sequenceidentifier have a finite number of digits. If both Seq_ID and Sequenceidentifier are expressed by n bits, the comparison in step S2103 assumes $((2^n-1)<0\ (=2^n))$.

In a normal sequence, upon processing one ORB, Sequenceidentifier is incremented by 1, as will be described later. Also, Sequenceidentifier and Seq_ID in the ORB have the same number of digits, and Sequenceidentifier is incremented by 1. For this reason, when the processing progresses without any errors, Sequenceidentifier and Seq_ID in the ORB must match each other in step S2103. Hence, if the processing progresses normally, the flow advances from step S2103 to step S2104.

It is checked if the client has prepared data (step S2104). If data is prepared, data of a predetermined size of the client is written at an address obtained by adding a DataDescriptor value of the ORB and an offset value stored in Nextexecpointer held by the read execution agent (step S2105). Note that this Nextexecpointer also has the same name as that of the write execution agent but is another pointer. When the ORB is processed for the first time, since offset=0, data is written from the start address of the buffer indicated by the ORB. When data is written in the buffer in which data has already been written halfway through, since offset indicates the next address in the buffer, the write can proceed from the next address by adding offset. After the data is stored in the buffer, Nextexecpointer is updated so that DataDescriptor value+offset indicates the next write address (step S2106). Such data write repeats itself until all data prepared by the client are written (step S2107).

Upon processing one ORB, Sequenceidentifier is incremented by 1 (step S2108), and Nextexecpointer (offset) is reset to 0 (step S2109).

Also, a status block that informs the initiator of completion of processing is generated (step S2110), and is written in the status FIFO (step S2111). Then, the client of the target is informed of completion of transmission (step S2112).

On the other hand, when the initiator recovers the ORB list in the sequence shown in FIG. 18 after bus reset or the like, it is determined in step S2103 that Seq_ID in the ORB is smaller than Sequenceidentifier. Hence, as in the write execution agent, the status block is passed to the initiator in step S2110 and the subsequent steps.

<Data Write Sequence to Target>

Figure 22:
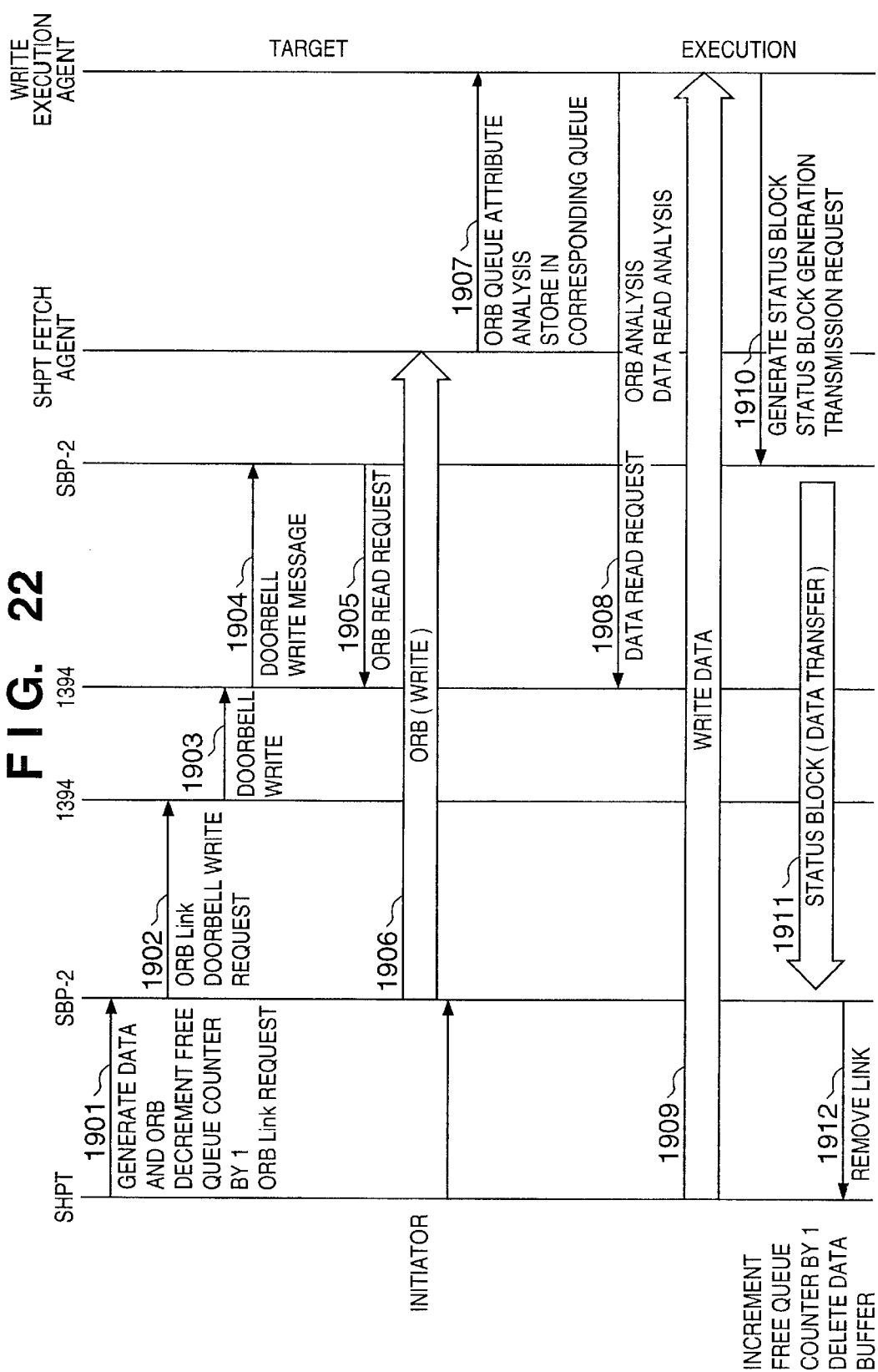
FIG. 22 is a sequence chart upon data write from the initiator (host computer) to the target (printer)

FIG. 22 shows an example of the sequence upon writing data from the initiator (host computer) to the target (printer).

Note that SBP-2 in FIG. 22 is a processing layer that processes data specified in the SBP-2 standard, i.e., a field specified in SBP-2. Also, SHPT is a processing layer that executes processes which are not specified in SBP-2 and are defined in units of functions. SHPT executes the sequences in the aforementioned flow charts. SBP-2 provides functions such as an ORB link, a doorbell write, passing an ORB and status to SHPT, and the like.

The client of the initiator generates data and a write command, SHPT generates an ORB (in this case, a write ORB), counter CurrentWriteQUE is decremented by 1, and an ORB link request is issued to SBP-2 (1901). SBP-2 links the ORB. The IEEE1394 interface writes a value in the doorbell register (1903), and that message is sent to SBP-2 of the target (1904).

Upon receiving the message, SBP-2 issues an ORB read request to the IEEE1394 interface (1905), and the ORB is read out from the system memory (1906). SHPT stores a command in the corresponding queue in accordance with the contents of the readout ORB (1907). In this case, since the readout ORB is a write command ORB, a data read request is issued to the IEEE1394 interface (1908). In response to this request, data is read out from the designated address, and is passed to the client (1909). In this case, the client is a rasterizer or the like that rasterizes an image, and if the data is a rasterized image, it is printed out by the printer engine.

Upon completion of the processing, the write execution agent issues a status block transmission request to SBP-2 (1910), and a status block is sent back to the initiator (1911). Upon reception of the status block, SHPT of the initiator deletes the corresponding ORB from the link, and increments a free queue counter by 1 (1912).

With the aforementioned sequence, data is written from the initiator in the target.

<Data Read Sequence from Target>

Figure 23:
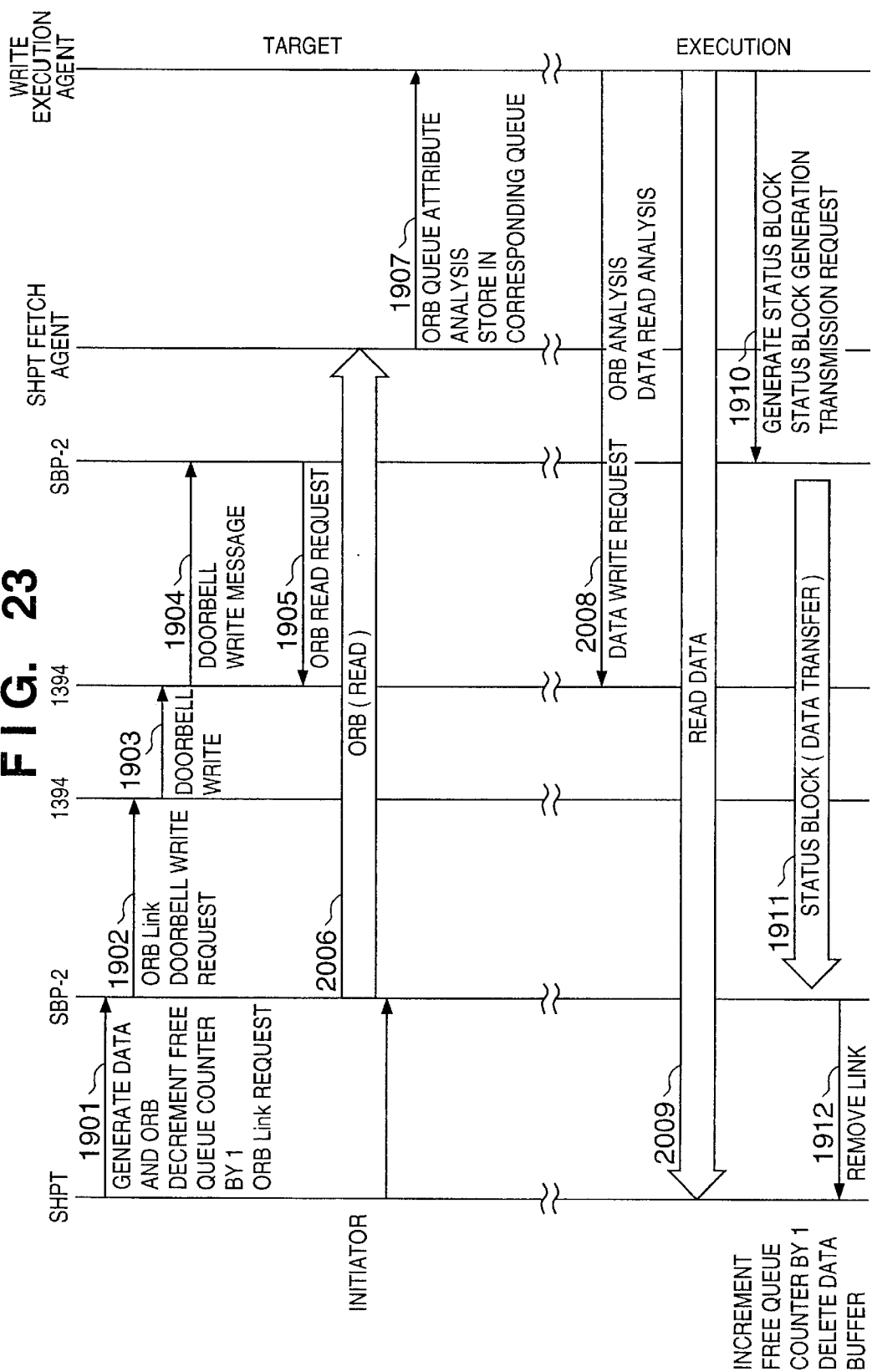
FIG. 23 is a sequence chart upon data read from the initiator (host computer) to the target (printer)

FIG. 23 shows an example of the sequence upon reading data of the target (printer) by the initiator (host computer).

The client of the initiator generates a read command and SHPT generates an ORB (a read ORB in this case), counter CurrentReadQUE is decremented by 1, and an ORB link request is issued to SBP-2 (1901). SBP-2 links the ORB. The IEEE1394 interface writes a value in the doorbell register (1903), and that message is sent to SBP-2 of the target (1904).

Upon receiving the message, SBP-2 issues an ORB read request to the IEEE1394 interface (1905), and an ORB is read out from the system memory (1906). SHPT stores a command in the corresponding queue in accordance with the contents of the readout ORB (1907).

The read execution agent waits until data to be passed to the initiator is generated. After data is generated, the read execution agent issues a data write request to the IEEE1394 interface (2008). In response to this request, data prepared at the designated address is written (2009).

Upon completion of the processing, the read execution agent issues a status block transmission request to SBP-2 (1910), and a status block is sent back to the initiator (1911). Upon reception of the status block, SHPT of the initiator deletes the corresponding ORB from the link, and increments a free queue counter by 1 (1912).

With this sequence, the initiator can read out data from the target.

In this manner, data exchange can be done between the initiator and target in two ways with a simple control sequence. More specifically, the initiator can pass desired data to the target at a desired timing. Also, the target can read out data passed from the initiator at its own convenience. The target can pass data to the initiator anytime it wants, either spontaneously or in response to a request from the initiator. Even when bus reset has occurred, continuation of processes from the state immediately before bus reset can be guaranteed.

Other Embodiments

Figure 7:
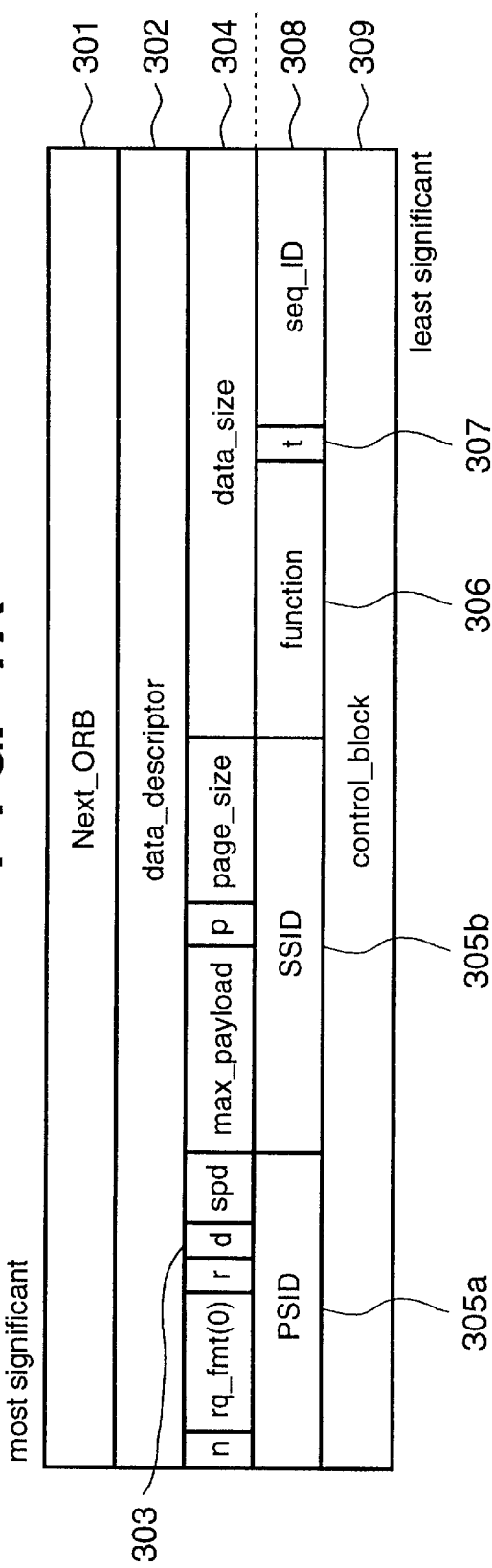
FIGS. 7A and 7B show the general format of an ORB.

As shown in FIG. 7, an ORB has channel identifier fields PSID and SSID. For this reason, when the SHPT processor and ORB generate and process ORBs using independent queues and execution agents in units of channels by identifying these channel identifiers, multi-channels can be realized. In this case, even in a single device, by assigning one channel to each of a plurality of clients included in that device, asynchronous communications can be made in units of clients. For this reason, in case of, e.g., a digital hybrid machine, if applications that serve as clients are prepared in correspondence with a scanner, printer, and the like of that machine, the host computer connected to the machine can use these functions as if they were independent functions. As shown in the flow charts, since queue management and execution agents are independent processes, multi-channels can be easily implemented.

Note that the present invention may be applied to either a system constituted by a plurality of devices (e.g., a host computer, an interface device, a reader, a printer, and the like), or an apparatus consisting of a single equipment (e.g., a copying machine, a facsimile apparatus, or the like).

The objects of the present invention are also achieved by supplying a storage medium, which records a program codes of the sequences shown in FIGS. 13 to 18 as an initiator, to a computer, and reading out and executing the program code stored in the storage medium by that computer (or a CPU or MPU). Also, a target can be implemented by supplying a storage medium, which records a program codes of the sequences shown in FIGS. 19 to 21 as an initiator, to a computer, and reading out and executing the program code stored in the storage medium by that computer (or a CPU or MPU).

In this case, the program code itself read out from the storage medium realizes the functions of the above-mentioned embodiments, and the storage medium which stores the program code constitutes the present invention.

As the storage medium for supplying the program code, for example, a floppy disk, hard disk, optical disk, magneto-optical disk, CD-ROM, CD-R, magnetic tape, nonvolatile memory card, ROM, and the like may be used.

The functions of the above-mentioned embodiments may be realized not only by executing the readout program code by the computer but also by some or all of actual processing operations executed by an OS (operating system) running on the computer on the basis of an instruction of the program code.

Furthermore, the functions of the above-mentioned embodiments may be realized by some or all of actual processing operations executed by a CPU or the like arranged in a function extension board or a function extension unit, which is inserted in or connected to the computer, after the program code read out from the storage medium is written in a memory of the extension board or unit.

On the other hand, a main body that serves as the initiator by executing program codes read out from the storage medium is not limited to the computer, but may be any other devices as long as they are data transfer devices and have an SBP-2 login function.

To recapitulate, according to the present invention, asynchronous, two-way communications can be made by a single login process between the initiator and target, and resources such as processes and memories required for data exchange can be efficiently used.

Since the IEEE1394 interface is used, data transfer to the target can be done by reading out data by the target at its own convenience, and the initiator can be prevented from being occupied by data transfer requested by the target.

Since the SBP-2 protocol is used, only ORBs are enqueued in the target, and data itself to be actually transferred is stored in the initiator during a processing wait period. Hence, the memory resource of the target can have a small size.

Furthermore, multi-channels can be easily realized.

Moreover, since the latest processing state is held, even when bus reset has occurred, the processing can be restarted from the state immediately before bus reset, after bus reset, and normal continuation of the processing can be guaranteed.

As many apparently widely different embodiments of the present invention can be made without departing from the spirit and scope thereof, it is to be understood that the invention is not limited to the specific embodiments thereof except as defined in the appended claims.

What is claimed is:

1. A communication control method between an initiator and a target, wherein the initiator has a storage area comprising the initiator issuing a predetermined command including an identifier to the target and holding the command; and the target reading out or writing data from or to the storage area of the initiator in response to the command from the initiator, and issuing a completion message to the initiator, wherein the initiator re-issuably holds the issued command until the initiator receives the completion message indicating completion of processing corresponding to the command from the target, and wherein when a connection between the initiator and target is temporarily disconnected and is connected again, the target compares the identifier of the command issued by the initiator with a held identifier, and the target makes a read or write from a held offset of the storage area when the two identifiers match, and issues a process completion message corresponding to the command to the initiator without making a read or write to the storage area of the initiator when the two identifiers do not match.

2. A communication control method between an initiator and a target, wherein the initiator has a storage area, comprising:

the initiator issuing a predetermined command including a data address in the storage area to the target and holding the command; and the target holding the command from the initiator in a queue, reading out or writing data from or to the storage area of the initiator in accordance with the data address included in the command from the initiator, and issuing a completion message to the initiator, wherein the initiator re-issuably holds the issued command until the initiator receives the completion message indicating completion of processing corresponding to the command from the target.

3. The method according to claim 1, wherein when a connection between the initiator and target is temporarily disconnected and is connected again, the initiator holds a correspondence between the command issued to the target, and the storage area which is to undergo a read or write in response to the data address in the command.

4. The method according to claim 1, wherein when a connection between the initiator and target is temporarily disconnected and is connected again, the initiator holds contents of the storage area which is to undergo a read or write in response to the command issued to the target.

5. The method according to claim 1, wherein when a connection between the initiator and target is temporarily disconnected and is connected again, the initiator re-issues the re-issuably held command to the target.

6. The method according to claim 1, wherein the target holds an identifier in the command which is being executed, and an offset of the storage area which is undergoing a read or write in response to the command which is being executed, in units of types of commands issued by the initiator.

7. A communication system comprising an initiator and a target, wherein said initiator has a storage area, wherein the initiator includes means for issuing a predetermined command including a data address in the storage area to the target and for holding the command;

wherein the target includes means for holding the command from the initiator, reading out or writing data from or to the storage area of the initiator in accordance with the data address included in the command from the initiator, and issuing a completion message to the initiator, and wherein the initiator re-issuably holds the issued command until the initiator receives the completion message indicating completion of processing corresponding to the command from the target.

8. The system according to claim 7, wherein when a connection between the initiator and target is temporarily disconnected and is connected again, the initiator holds a correspondence between the command issued to the target, and the storage area which is to undergo a read or write in response to the data address in the command.

9. The system according to claim 7, wherein when a connection between the initiator and target is temporarily disconnected and is connected again, the initiator holds contents of the storage area which is to undergo a read or write in response to the command issued to the target.

10. The system according to claim 7, wherein when a connection between the initiator and target is temporarily disconnected and is connected again, the initiator re-issues the re-issuably held command to the target.

11. The system according to claim 7, wherein the target holds an identifier in the command which is being executed, and an offset of the storage area which is undergoing a read or write in response to the command which is being executed, in units of types of commands issued by the initiator.

12. A communication system comprising an initiator and a target, wherein said initiator has a storage area, wherein the initiator includes means for issuing a predetermined command including an identifier to the target and holding the command;

wherein the target includes means for reading out or writing data from or to the storage area of the initiator in response to the command from the initiator, and for issuing a completion message to the initiator, wherein the initiator re-issuably holds the issued command until the initiator receives the completion message indicating completion of processing corresponding to the command from the target, and wherein when a connection between the initiator and target is temporarily disconnected and is connected again, the target compares an identifier of the command issued by the initiator with a held identifier, and the target makes a read or write from a held offset of the storage area when the two identifiers match, and issues a process completion message corresponding to the command to the initiator without making a read or write to the storage area of the initiator when the two identifiers do not match.

13. A communication control apparatus for exchanging data in response to issuance of a command which includes a data address, wherein a target holds the command in a queue and reads or writes data in accordance with the data address included in the command, comprising:

a memory including a storage area from or to which data is read out or written by the target in accordance with the data address in the command; and holding means for re-issuably holding the command issued to the target until a process completion message indicating completion of processing corresponding to the command is received from the target.

14. The apparatus according to claim 13, further comprising holding means for holding a correspondence between the command issued to the target, and the storage area from or to which data is read out or written by the target.

15. The apparatus according to claim 13, wherein when a connection with the target is temporarily disconnected and connected again, the command re-issuably held by said holding means is re-issued to the target.

16. A computer readable storage medium for exchanging data in response to issuance of a command which includes a data address, wherein a target holds the command in a queue and reads out or writes data in accordance with the data address included in the command, said code comprising:

code to re-issuably hold the command issued to the target until a process completion message indicating completion of processing corresponding to the command is received from the target;

code to hold a correspondence between the command issued to the target, and a storage area from or to which data is read out or written by the target in accordance with the data address in the command; and code to re-issue the re-issuably held command to the target when a connection with the target is temporarily disconnected and connected again.

* * * * *

UNITED STATES PATENT AND TRADEMARK OFFICE
CERTIFICATE OF CORRECTION

PATENT NO.    : 6,477,587 B1
DATED         : November 5, 2002
INVENTOR(S)   : Isoda et al.

It is certified that error appears in the above-identified patent and that said Letters Patent is hereby corrected as shown below:

Column 6,
Line 39, "the some" should read -- some --.

Column 16,
Lines 33 and 38, "a program" should read -- program --.

Column 17,
Line 30, "area" should read -- area, --; and
Line 31, "prising" should read -- prising: --.

Signed and Sealed this

Sixth Day of January, 2004

JAMES E. ROGAN
*Director of the United States Patent and Trademark Office*